(12) United States Patent
Yerramalli et al.

(10) Patent No.: US 9,955,478 B2
(45) Date of Patent: Apr. 24, 2018

(54) TECHNIQUES FOR MANAGING COMMUNICATIONS IN A SHARED RADIO FREQUENCY SPECTRUM BAND

(71) Applicant: QUALCOMM Incorporated, San Diego, CA (US)

(72) Inventors: Srinivas Yerramalli, San Diego, CA (US); Tao Luo, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 134 days.

(21) Appl. No.: 15/080,393

(22) Filed: Mar. 24, 2016

(65) Prior Publication Data

US 2016/0309467 A1 Oct. 20, 2016

Related U.S. Application Data

(60) Provisional application No. 62/149,373, filed on Apr. 17, 2015.

(51) Int. Cl.
*H04W 4/00* (2018.01)
*H04W 72/04* (2009.01)
(Continued)

(52) U.S. Cl.
CPC ....... *H04W 72/0446* (2013.01); *H04L 1/1812* (2013.01); *H04W 72/0453* (2013.01);
(Continued)

(58) Field of Classification Search
None
See application file for complete search history.

(56) References Cited

U.S. PATENT DOCUMENTS

2011/0128928 A1 6/2011 Lin et al.
2012/0140689 A1* 6/2012 Pelletier .............. H04W 76/048
370/311
(Continued)

FOREIGN PATENT DOCUMENTS

WO WO-2013006379 A1 1/2013
WO WO-2015047145 A1 4/2015

OTHER PUBLICATIONS

ISA/EP, International Search Report and Written Opinion of the International Searching Authority, Int'l. App. No. PCT/US2016/024282, dated Jul. 5, 2016, European Patent Office, Rijswijk, NL, 13 pgs.

(Continued)

*Primary Examiner* — Minh-Trang Nguyen
(74) *Attorney, Agent, or Firm* — Dalei Dong; Holland & Hart LLP

(57) ABSTRACT

Techniques are described for wireless communication. A first method includes receiving a semi-static partial subframe configuration and a corresponding partial subframe identifier; receiving a grant for a partial subframe, the grant identifying the partial subframe identifier; and receiving data scheduled for the partial subframe over a shared radio frequency spectrum band based at least in part on the semi-static partial subframe configuration. A second method includes monitoring a plurality of symbol periods for at least one channel reservation signal transmitted over a shared radio frequency spectrum band, where the at least one channel reservation signal is encoded based at least in part on each symbol period of the plurality of symbol periods; and receiving a downlink transmission over the shared radio frequency spectrum band, where the downlink transmission follows the plurality of channel reservation signals.

30 Claims, 18 Drawing Sheets

(51) Int. Cl.
*H04W 72/12* (2009.01)
*H04L 1/18* (2006.01)
*H04W 72/14* (2009.01)
*H04W 76/04* (2009.01)

(52) U.S. Cl.
CPC ....... *H04W 72/1278* (2013.01); *H04W 72/14* (2013.01); *H04W 76/046* (2013.01)

(56) References Cited

U.S. PATENT DOCUMENTS

| | | | |
|---|---|---|---|
| 2012/0300681 A1* | 11/2012 | Ji | H04W 56/00 370/280 |
| 2014/0362780 A1 | 12/2014 | Malladi et al. | |
| 2015/0373668 A1* | 12/2015 | Lee | H04W 72/042 370/329 |
| 2016/0278050 A1* | 9/2016 | Nory | H04W 16/14 |
| 2016/0302230 A1* | 10/2016 | Novlan | H04B 17/318 |

OTHER PUBLICATIONS

QUALCOMM Incorporated, "Coexistence Mechanisms," 3GPP TSG RAN WG1 #80, Athens, Greece, R1-150476, Feb. 9-13, 2015, 4 pgs., XP_ 50933684A, 3rd Generation Partnership Project.

* cited by examiner

1200

Receiving a control channel of a partial subframe over a shared radio frequency spectrum band, wherein a first amount of resources allocated to the control channel is based at least in part on a second amount of resources allocated to the partial subframe — 1205

FIG. 12

TECHNIQUES FOR MANAGING COMMUNICATIONS IN A SHARED RADIO FREQUENCY SPECTRUM BAND

CROSS REFERENCES

The present Application for Patent claims priority to U.S. Provisional Patent Application No. 62/149,373 by Yerramalli, et al., titled 'Techniques For Managing Communications In A Shared Radio Frequency Spectrum Band," filed Apr. 17, 2015, assigned to the assignee hereof, which is hereby incorporated by reference in its entirety.

BACKGROUND

Field of the Disclosure

The present disclosure, for example, relates to wireless communication systems, and more particularly to techniques for managing communications in a shared radio frequency spectrum band.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, single-carrier frequency-division multiple access (SC-FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

Some modes of communication may enable communications between a base station and a UE in a shared radio frequency spectrum band, or in different radio frequency spectrum bands (e.g., a dedicated radio frequency spectrum band and a shared radio frequency spectrum band) of a cellular network. With increasing data traffic in cellular networks that use a dedicated (e.g., licensed) radio frequency spectrum band, offloading of at least some data traffic to a shared radio frequency spectrum band may provide a cellular operator with opportunities for enhanced data transmission capacity. A shared radio frequency spectrum band may also provide service in areas where access to a dedicated radio frequency spectrum band is unavailable.

SUMMARY

The present disclosure, for example, relates to one or more techniques for managing communications in a shared radio frequency spectrum band. More particularly, the techniques relate to the handling of partial subframe transmissions, the removal of ambiguity between channel reservation signal transmissions and cell-specific reference signal (CRS) transmissions, the indication of downlink-uplink transmission configurations, the indication of a random access channel (RACH) occasion on a secondary component carrier (SCC), the enablement of an uplink only mode, or the indication of co-located serving cells.

In one example, a method for wireless communication at a UE is described. The method may include receiving a semi-static partial subframe configuration and a corresponding partial subframe identifier; receiving a grant for a partial subframe, the grant identifying the partial subframe identifier; and receiving data scheduled for the partial subframe over a shared radio frequency spectrum band based at least in part on the semi-static partial subframe configuration.

In some examples, the method may further include receiving the semi-static partial subframe configuration in a radio resource control (RRC) message. In some examples, the semi-static partial subframe configuration may include at least a resource block (RB) allocation type, or a RB allocation, or a transmission rank, or a modulation and coding scheme (MCS), or a transport block size (TBS) table, or a combination thereof. In some examples, the method may include receiving a dynamic partial subframe configuration, and receiving the data scheduled for the partial subframe based at least in part on the dynamic partial subframe configuration. In some examples, the semi-static partial subframe configuration may include at least one of a time domain multiplexed (TDM) configuration or a frequency domain multiplexed (FDM) configuration. In some examples, the grant for the partial subframe may include at least a hybrid automatic repeat request (HARQ) identifier (ID), or a retransmission index, or a new data indicator (NDI), or a combination thereof. In some examples, the grant may be received over a dedicated radio frequency spectrum band.

In some examples, the method may further include receiving data scheduled for a plurality of partial subframes over the shared radio frequency spectrum band based at least in part on the semi-static partial subframe configuration. In some examples, the method may further include receiving a retransmission of data initially transmitted in the partial subframe in at least one full subframe. In some examples, the semi-static partial subframe configuration may be for a partial subframe occurring at a beginning of a subframe or at an end of a subframe. In some examples, the semi-static partial subframe configuration may indicate a type of partial subframe to which the semi-static partial subframe configuration applies. In some examples, the type of partial subframe may be based at least in part on a length of partial subframe. In some examples, the method may further include receiving an indication of at least one of: a number of partial subframes to which the semi-static partial subframe configuration applies; a number of downlink bursts to which the semi-static partial subframe configuration applies; a time duration to which the semi-static partial subframe configuration applies; or an indication that the semi-static partial subframe configuration applies until an alternative indication is received. In other examples, the partial subframe type may be based at least in part on a length of partial subframe; for example, the length of the partial subframe may determine whether the partial subframe is an uplink (UL) or a downlink (DL) partial subframe. For a UL partial subframe, the UE may autonomously adjust a parameter associated with the initial and/or end UL partial subframes, such as adjusting a HARQ parameter, a MSC parameter, and the like. In another example, the UE may select a parameter to adjust from a list of preconfigured configurations.

In one example, an apparatus for wireless communication at a UE is described. The apparatus may include means for receiving a semi-static partial subframe configuration and a corresponding partial subframe identifier; means for receiving a grant for a partial subframe, the grant identifying the partial subframe identifier; and means for receiving data scheduled for the partial subframe over a shared radio frequency spectrum band based at least in part on the semi-static partial subframe configuration.

In one example, another apparatus for wireless communication at a UE is described. The apparatus may include a processor, memory in electronic communication with the processor, and instructions stored in the memory. The instructions may be executable by the processor to receive a semi-static partial subframe configuration and a corresponding partial subframe identifier; to receive a grant for a partial subframe, the grant identifying the partial subframe identifier; and to receive data scheduled for the partial subframe over a shared radio frequency spectrum band based at least in part on the semi-static partial subframe configuration.

In one example, a non-transitory computer-readable medium storing computer-executable code for wireless communication is described. In one example, the code may be executable by a processor to receive a semi-static partial subframe configuration and a corresponding partial subframe identifier; to receive a grant for a partial subframe, the grant identifying the partial subframe identifier; and to receive data scheduled for the partial subframe over a shared radio frequency spectrum band based at least in part on the semi-static partial subframe configuration.

In one example, another method for wireless communication at a UE is described. The method may include receiving first data scheduled for a partial subframe over a shared radio frequency spectrum band, where the partial subframe includes a portion of a subframe encoded as a full subframe, and receiving second data scheduled for a full subframe over the shared radio frequency spectrum band, where the first data and the second data are encoded differently.

In some examples of the method, the first data may be encoded using at least one of a first MCS or a first TBS that is lower than a second MCS or a second TBS supported by a channel quality of a channel over which the first data is received. In some examples, the first data may include a portion of data encoded for a full subframe.

In one example, another apparatus for wireless communication at a UE is described. The apparatus may include means for receiving first data scheduled for a partial subframe over a shared radio frequency spectrum band, where the partial subframe includes a portion of a subframe encoded as a full subframe, and means for receiving second data scheduled for a full subframe over the shared radio frequency spectrum band, where the first data and the second data are encoded differently.

In one example, another apparatus for wireless communication at a UE is described. The apparatus may include a processor, memory in electronic communication with the processor, and instructions stored in the memory. The instructions may be executable by the processor to receive first data scheduled for a partial subframe over a shared radio frequency spectrum band, where the partial subframe includes a portion of a subframe encoded as a full subframe, and to receive second data scheduled for a full subframe over the shared radio frequency spectrum band, where the first data and the second data are encoded differently.

In one example, another non-transitory computer-readable medium storing computer-executable code for wireless communication is described. The code may be executable by a processor to receive first data scheduled for a partial subframe over a shared radio frequency spectrum band, where the partial subframe includes a portion of a subframe encoded as a full subframe, and to receive second data scheduled for a full subframe over the shared radio frequency spectrum band, where the first data and the second data are encoded differently.

In one example, another method for wireless communication at a UE is described. The method may include receiving a control channel of a partial subframe over a shared radio frequency spectrum band, where a first amount of resources allocated to the control channel is based at least in part on a second amount of resources allocated to the partial subframe.

In some examples of the method, the control channel may include an enhanced physical data control channel (EPDCCH). In some examples, the first amount of resources allocated to the control channel may include an amount of frequency resources. In some examples, the amount of frequency resources may be scaled higher when the second amount of resources allocated to the partial subframe includes a lower amount of time resources, and the amount of frequency resources may be scaled lower when the second amount of resources allocated to the partial subframe includes a higher amount of time resources.

In one example, another apparatus for wireless communication at a UE is described. The apparatus may include means for receiving a control channel of a partial subframe over a shared radio frequency spectrum band, where a first amount of resources allocated to the control channel is based at least in part on a second amount of resources allocated to the partial subframe.

In one example, another apparatus for wireless communication at a UE is described. The apparatus may include a processor, memory in electronic communication with the processor, and instructions stored in the memory. The instructions may be executable by the processor to receive a control channel of a partial subframe over a shared radio frequency spectrum band, where a first amount of resources allocated to the control channel is based at least in part on a second amount of resources allocated to the partial subframe.

In one example, another non-transitory computer-readable medium storing computer-executable code for wireless communication is described. In one example, the code may be executable by a processor to receive a control channel of a partial subframe over a shared radio frequency spectrum band, where a first amount of resources allocated to the control channel is based at least in part on a second amount of resources allocated to the partial subframe.

In one example, another method for wireless communication at a UE is described. The method may include receiving same-carrier scheduling for a partial subframe transmitted over a shared radio frequency spectrum band, and receiving one of the same-carrier scheduling or cross-carrier scheduling for a full subframe received over the shared radio frequency spectrum band.

In some examples of the method, cross-carrier scheduling for the full subframe may be received on a primary component carrier (PCC) in a dedicated radio frequency spectrum band. In some examples, same-carrier scheduling for the partial subframe may be received on an EPDCCH.

In one example, another apparatus for wireless communication at a UE is described. The apparatus may include means for receiving same-carrier scheduling for a partial subframe transmitted over a shared radio frequency spectrum band, and means for receiving one of the same-carrier scheduling or cross-carrier scheduling for a full subframe received over the shared radio frequency spectrum band.

In one example, another apparatus for wireless communication at a UE is described. The apparatus may include a processor, memory in electronic communication with the processor, and instructions stored in the memory. The instructions may be executable by the processor to receive same-carrier scheduling for a partial subframe transmitted over a shared radio frequency spectrum band, and to receive one of the same-carrier scheduling or cross-carrier scheduling for a full subframe received over the shared radio frequency spectrum band.

In one example, another non-transitory computer-readable medium storing computer-executable code for wireless communication is described. In one example, the code may be executable by a processor to receive same-carrier scheduling for a partial subframe transmitted over a shared radio frequency spectrum band, and to receive one of the same-carrier scheduling or cross-carrier scheduling for a full subframe received over the shared radio frequency spectrum band.

In one example, another method for wireless communication at a UE is described. The method may include monitoring a plurality of symbol periods for at least one channel reservation signal transmitted over a shared radio frequency spectrum band, where the at least one channel reservation signal is encoded based at least in part on each symbol period of the plurality of symbol periods; and receiving a downlink transmission over the shared radio frequency spectrum band. The downlink transmission follow the at least one channel reservation signal.

In some examples of the method, the at least one channel reservation signal may include a plurality of channel reservation signals transmitted in different contiguous symbol periods of the plurality of symbol periods, where an encoding of a first channel reservation signal received in a first symbol period of the plurality of symbol periods differs from an encoding of a second channel reservation signal received in a second symbol period of the plurality of symbol periods. In some examples, the at least one channel reservation signal may include a channel reservation signal encoded based on a number of symbol periods for which the channel reservation signal is transmitted. In some examples, the downlink transmission may include data scheduled for a partial subframe. In some examples, the at least one channel reservation signal may include at least one downlink channel usage beacon signal (D-CUBS). In some examples, the method may include monitoring for a cell-specific reference signal (CRS) transmitted between the at least one channel reservation signal and the downlink transmission, where each of the at least one channel reservation signal is encoded differently than the CRS. In some examples, the different encoding may include a different sequence scrambling.

In one example, another apparatus for wireless communication at a UE is described. The apparatus may include means for monitoring a plurality of symbol periods for at least one channel reservation signal transmitted over a shared radio frequency spectrum band, where the at least one channel reservation signal is encoded based at least in part on each symbol period of the plurality of symbol periods; and means for receiving a downlink transmission over the shared radio frequency spectrum band. The downlink transmission may follow the at least one channel reservation signal.

In one example, another apparatus for wireless communication at a UE is described. The apparatus may include a processor, memory in electronic communication with the processor, and instructions stored in the memory. The instructions may be executable by the processor to monitor a plurality of symbol periods for at least one channel reservation signal transmitted over a shared radio frequency spectrum band, where the at least one channel reservation signal is encoded based at least in part on each symbol period of the plurality of symbol periods; and to receive a downlink transmission over the shared radio frequency spectrum band. The downlink transmission may follow the at least one channel reservation signal.

In one example, another non-transitory computer-readable medium storing computer-executable code for wireless communication is described. In one example, the code may be executable by a processor to monitor a plurality of symbol periods for at least one channel reservation signal transmitted over a shared radio frequency spectrum band, where the at least one channel reservation signal is encoded based at least in part on each symbol period of the plurality of symbol periods; and to receive a downlink transmission over the shared radio frequency spectrum band. The downlink transmission may follow the at least one channel reservation signal.

In one example, another method for wireless communication at a UE is described. The method may include receiving a first indication of a subset of a plurality of downlink-uplink transmission configurations of a frame period; receiving a second indication of a downlink-uplink transmission configuration included in the subset of the plurality of downlink-uplink transmission configurations; and receiving a downlink transmission over a shared radio frequency spectrum band according to the indicated downlink-uplink transmission configuration.

In some examples of the method, the subset of the plurality of downlink-uplink transmission configurations may include at least one partial subframe configuration. In some examples, the first indication of the subset of the plurality of downlink-uplink transmission configurations may be received in a RRC message. In some examples, the second indication may indicate a downlink-uplink configuration including at least one of: a plurality of downlink bursts, or a plurality of uplink bursts, or a plurality of downlink bursts and at least one uplink burst, or a plurality of uplink bursts and at least one downlink burst, or a combination thereof. In some examples, the method may include determining the shared radio frequency spectrum band is available prior to receiving the downlink transmission, and refraining from determining the shared radio frequency spectrum band is available again until after the downlink transmission. In some examples, each of the downlink bursts and the uplink bursts of the downlink transmission may be separated from other downlink bursts or other uplink bursts by a transmission gap. In some examples, the transmission gap may include a number of clear channel assessment (CCA) occasions (e.g., one or more CCA occasions). In some examples, the second indication may indicate a downlink-uplink configuration including a sequence of alternating downlink bursts and uplink bursts.

In one example, another apparatus for wireless communication at a UE is described. The apparatus may include means for receiving a first indication of a subset of a plurality of downlink-uplink transmission configurations of a frame period; means for receiving a second indication of a downlink-uplink transmission configuration included in the subset of the plurality of downlink-uplink transmission configurations; and means for receiving a downlink transmission over a shared radio frequency spectrum band according to the indicated downlink-uplink transmission configuration.

In one example, another apparatus for wireless communication at a UE is described. The apparatus may include a processor, memory in electronic communication with the processor, and instructions stored in the memory. The instructions may be executable by the processor to receive a first indication of a subset of a plurality of downlink-uplink transmission configurations of a frame period; to receive a second indication of a downlink-uplink transmission configuration included in the subset of the plurality of downlink-uplink transmission configurations; and to receive a downlink transmission over a shared radio frequency spectrum band according to the indicated downlink-uplink transmission configuration.

In one example, another non-transitory computer-readable medium storing computer-executable code for wireless communication is described. In one example, the code may be executable by a processor to receive a first indication of a subset of a plurality of downlink-uplink transmission configurations of a frame period; to receive a second indication of a downlink-uplink transmission configuration included in the subset of the plurality of downlink-uplink transmission configurations; and to receive a downlink transmission over a shared radio frequency spectrum band according to the indicated downlink-uplink transmission configuration.

In one example, another method for wireless communication at a UE is described. The method may include transmitting, on a PCC, a request for random access channel (RACH) resources on a secondary component carrier (SCC), and receiving, in response to transmitting the request for RACH resources on the SCC, an indication of a RACH occasion and an indication of the RACH resources on the SCC.

In some examples of the method, the PCC may be in one of a dedicated radio frequency spectrum band or a shared radio frequency spectrum band and the SCC may be in the shared radio frequency spectrum band. In some examples, the request for RACH resources on the SCC may be transmitted at least one of: in a physical (PHY) signal, in a scheduling request (SR), in a medium access control (MAC) control element, or multiplexed with uplink control information (UCI).

In one example, another apparatus for wireless communication at a UE is described. The apparatus may include means for transmitting, on a PCC, a request for RACH resources on a SCC, and means for receiving, in response to transmitting the request for RACH resources on the SCC, an indication of a RACH occasion and an indication of the RACH resources on the SCC.

In one example, another apparatus for wireless communication at a UE is described. The apparatus may include a processor, memory in electronic communication with the processor, and instructions stored in the memory. The instructions may be executable by the processor to transmit, on a PCC, a request for RACH resources on a SCC, and to receive, in response to transmitting the request for RACH resources on the SCC, an indication of a RACH occasion and an indication of the RACH resources on the SCC.

In one example, another non-transitory computer-readable medium storing computer-executable code for wireless communication is described. In one example, the code may be executable by a processor to transmit, on a PCC, a request for RACH resources on a SCC, and to receive, in response to transmitting the request for RACH resources on the SCC, an indication of a RACH occasion and an indication of the RACH resources on the SCC.

In one example, another method for wireless communication at a UE is described. The method may include receiving a channel reservation signal from a base station over a shared radio frequency spectrum band, and beginning an uplink transmission to the base station, over the shared radio frequency spectrum band, upon receiving the channel reservation signal and without contending for access to the shared radio frequency spectrum band.

In some examples of the method, the uplink transmission may be preceded by another uplink transmission. In some examples, the channel reservation signal may include a D-CUB S. In some examples, the method may further include receiving in the channel reservation signal a physical frame format indicator channel (PFFICH) identifying a beginning of an uplink only mode.

In one example, another apparatus for wireless communication at a UE is described. The apparatus may include means for receiving a channel reservation signal from a base station over a shared radio frequency spectrum band, and means for beginning an uplink transmission to the base station, over the shared radio frequency spectrum band, upon receiving the channel reservation signal and without contending for access to the shared radio frequency spectrum band.

In one example, another apparatus for wireless communication at a UE is described. The apparatus may include a processor, memory in electronic communication with the processor, and instructions stored in the memory. The instructions may be executable by the processor to receive a channel reservation signal from a base station over a shared radio frequency spectrum band, and to begin an uplink transmission to the base station, over the shared radio frequency spectrum band, upon receiving the channel reservation signal and without contending for access to the shared radio frequency spectrum band.

In one example, another non-transitory computer-readable medium storing computer-executable code for wireless communication is described. In one example, the code may be executable by a processor to receive a channel reservation signal from a base station over a shared radio frequency spectrum band, and to begin an uplink transmission to the base station, over the shared radio frequency spectrum band, upon receiving the channel reservation signal and without contending for access to the shared radio frequency spectrum band.

In one example, another method for wireless communication at a UE is described. The method may include receiving from a base station an indication of whether a first serving cell and a second serving cell are co-located, and using information of the first serving cell to determine information of the second serving cell based at least in part on receiving an indication that the first serving cell and the second serving cell are co-located.

In some examples of the method, the information of the first serving cell may include at least one of a first time tracking, a first frequency tracking, a first Doppler tracking, or a first path loss measurement, and the information of the second serving cell may include at least one of a second time tracking, a second frequency tracking, a second Doppler tracking, or a second path loss measurement.

In one example, another apparatus for wireless communication at a UE is described. The apparatus may include means for receiving from a base station an indication of whether a first serving cell and a second serving cell are co-located, and means for using information of the first serving cell to determine information of the second serving cell based at least in part on receiving an indication that the first serving cell and the second serving cell are co-located.

In one example, another apparatus for wireless communication at a UE is described. The apparatus may include a processor, memory in electronic communication with the processor, and instructions stored in the memory. The instructions may be executable by the processor to receive from a base station an indication of whether a first serving cell and a second serving cell are co-located, and to use information of the first serving cell to determine information of the second serving cell based at least in part on receiving an indication that the first serving cell and the second serving cell are co-located.

In one example, another non-transitory computer-readable medium storing computer-executable code for wireless communication is described. In one example, the code may be executable by a processor to receive from a base station an indication of whether a first serving cell and a second serving cell are co-located, and to use information of the first serving cell to determine information of the second serving cell based at least in part on receiving an indication that the first serving cell and the second serving cell are co-located.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If the first reference label is used in the specification, the description is applicable to any one of the similar components having the same first reference label irrespective of the second reference label.

FIG. 12 is a flow chart illustrating an exemplary method for wireless communication, in accordance with various aspects of the present disclosure;

DETAILED DESCRIPTION

Techniques are described in which a shared radio frequency spectrum band is used for at least a portion of communications over a wireless communication system. In some examples, the shared radio frequency spectrum band may be used for LTE/LTE-A communications. The shared radio frequency spectrum band may be used in combination with, or independent from, a dedicated radio frequency spectrum band. The dedicated radio frequency spectrum band may be a radio frequency spectrum band for which transmitting apparatuses may not contend for access because the radio frequency spectrum band is licensed to some users (e.g., a licensed radio frequency spectrum band usable for LTE/LTE-A communications). The shared radio frequency spectrum band may be a radio frequency spectrum band for which a device may need to contend for access (e.g., a radio frequency spectrum band that is available for unlicensed use, such as Wi-Fi use, or a radio frequency spectrum band that is available for use by multiple operators in an equally shared or prioritized manner).

With increasing data traffic in cellular networks that use a dedicated radio frequency spectrum band, offloading of at least some data traffic to a shared radio frequency spectrum band may provide a cellular operator (e.g., an operator of a public land mobile network (PLMN) or a coordinated set of base stations defining a cellular network, such as an LTE/LTE-A network) with opportunities for enhanced data transmission capacity. Use of a shared radio frequency spectrum band may also provide service in areas where access to a dedicated radio frequency spectrum band is unavailable. Before communicating over a shared radio frequency spectrum band, transmitting apparatuses may perform a Listen Before Talk (LBT) procedure to gain access to the shared radio frequency spectrum band. Such an LBT procedure may include performing a clear channel assessment (CCA) procedure (or extended CCA procedure) to determine whether a channel of the shared radio frequency spectrum band is available. When it is determined that the channel of the shared radio frequency spectrum band is available, a CUBS may be transmitted to reserve the channel. When it is determined that a channel is not available, a CCA procedure (or extended CCA procedure) may be performed for the channel again at a later time.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
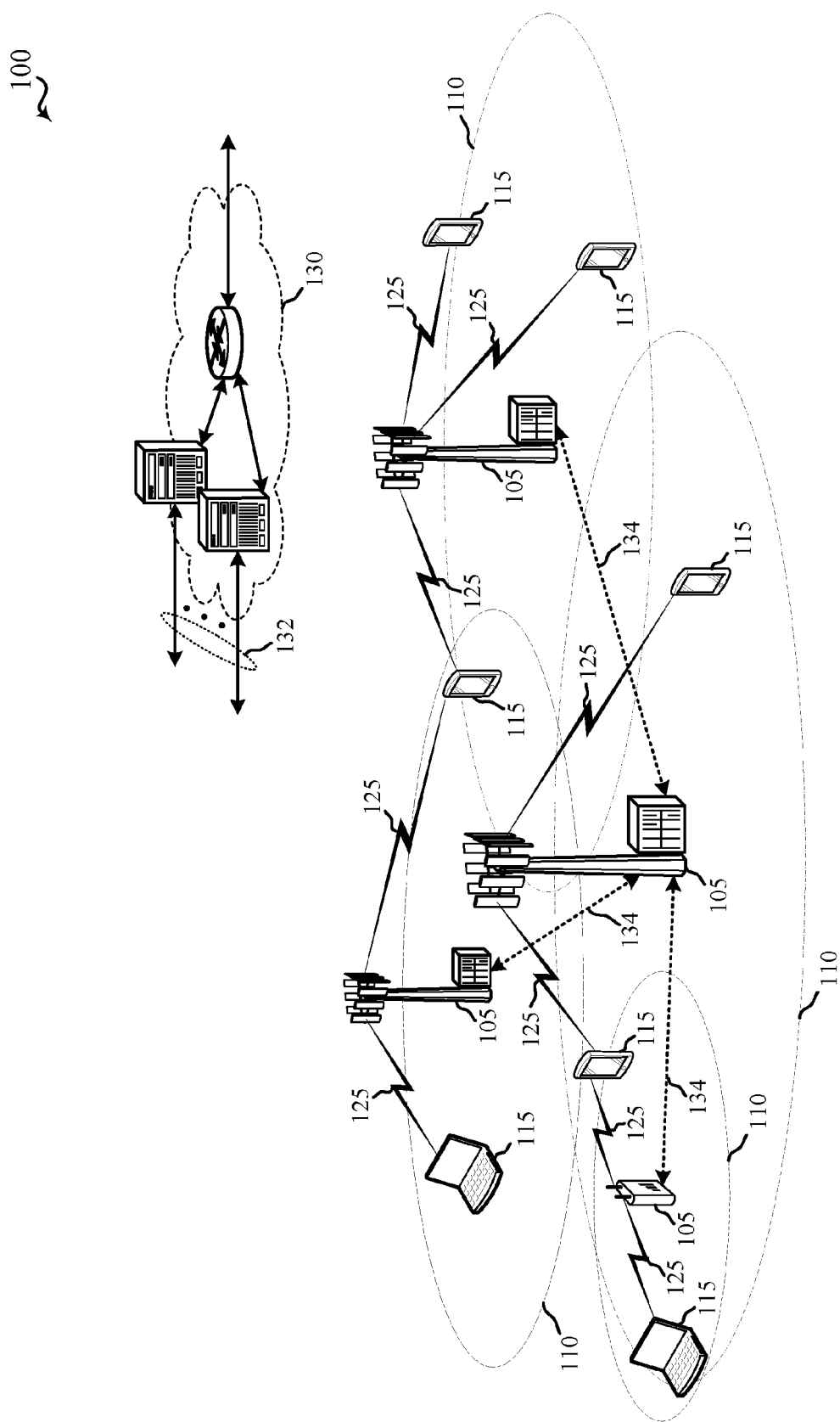
FIG. 1 illustrates an example of a wireless communication system, in accordance with various aspects of the present disclosure.

FIG. 1 illustrates an example of a wireless communication system 100, in accordance with various aspects of the present disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may include an LTE/LTE-A network. In LTE/LTE-A networks, the term evolved Node B (eNB) may be used to describe the base stations 105, while the term UE may be used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., dedicated, shared, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlink (DL) transmissions, from a base station 105 to a UE 115, or uplink (UL) transmissions, from a UE 115 to a base station 105. The downlink transmissions may also be called forward link transmissions, while the uplink transmissions may also be called reverse link transmissions.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some examples of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or dual-connectivity operation. A carrier may also be referred to as a component carrier (CC), a layer, a channel, etc. The terms "carrier," "component carrier," "cell," and "channel" may be used interchangeably herein. In an LTE/LTE-A network, a UE 115 may be configured to communicate using up to five component carriers (CCs) when operating in a carrier aggregation mode or dual-connectivity mode. One or more of the CCs may be configured as a DL CC, and one or more of the CCs may be configured as a UL CC. Also, one of the CCs allocated to a UE 115 may be configured as a primary CC (PCC) and be used to communicate with a primary serving cell (PCell), while the remaining CCs allocated to the UE 115 may be configured as secondary CCs (SCCs) and be used to communicate with one or more secondary serving cells (SCells). Carrier aggregation or dual-connectivity may be used with both FDD and TDD component carriers.

In some examples, the wireless communication system 100 may support operation over a dedicated radio frequency spectrum band (e.g., a radio frequency spectrum band for which transmitting apparatuses may not contend for access because the radio frequency spectrum band is licensed to some users for some uses (e.g., a licensed radio frequency spectrum band usable for LTE/LTE-A communications)) or a shared radio frequency spectrum band (e.g., a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner)). Upon winning a contention for access to the shared radio frequency spectrum band, a transmitting apparatus (e.g., a base station 105 or UE 115) may transmit one or more CUBS over the shared radio frequency spectrum band. The CUBS may reserve the shared radio frequency spectrum by providing a detectable energy on the shared radio frequency spectrum band. The CUBS may also serve to identify the transmitting apparatus or serve to synchronize the transmitting apparatus and a receiving apparatus.

Figure 2:
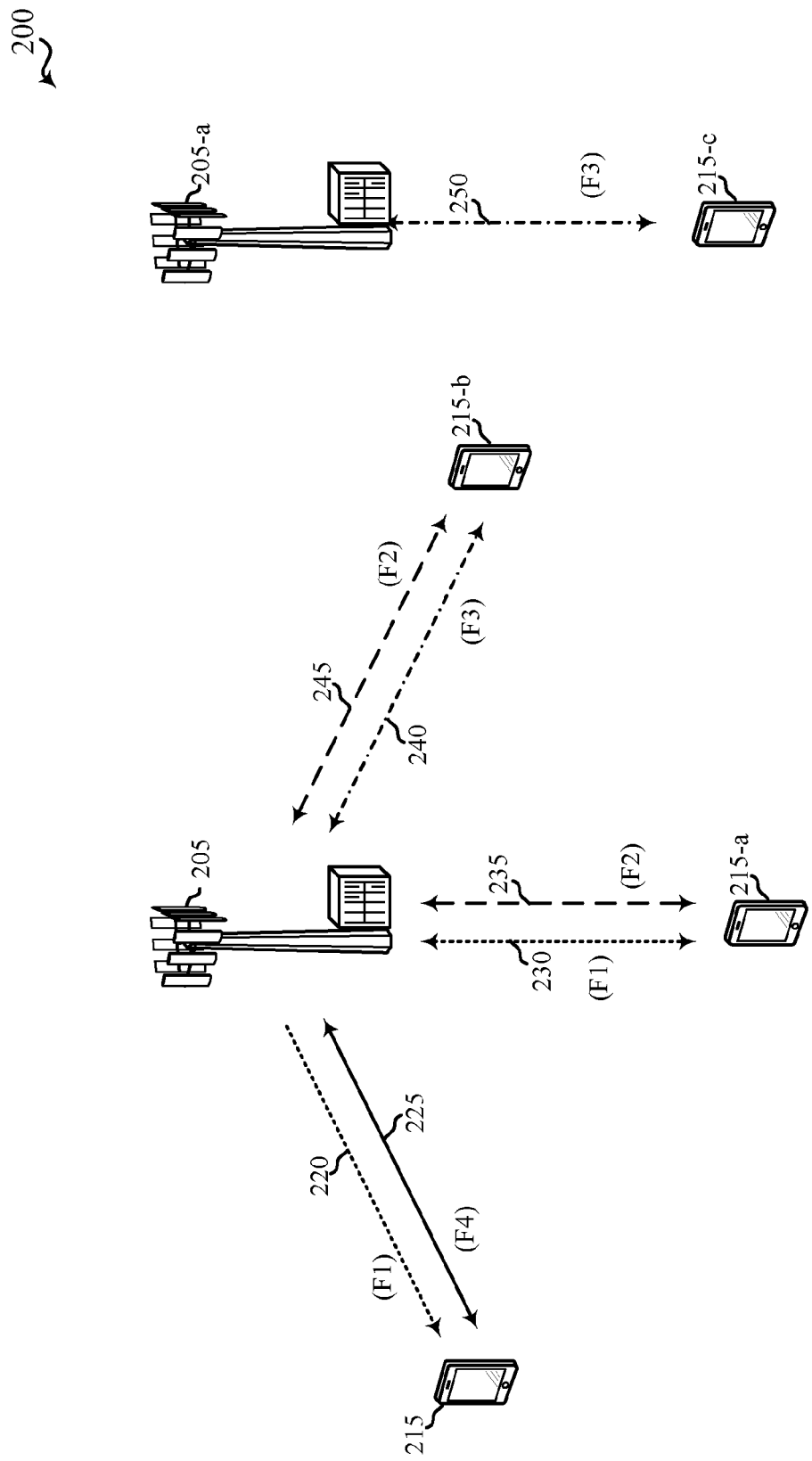
FIG. 2 shows a wireless communication system in which LTE/LTE-A may be deployed under different scenarios using a shared radio frequency spectrum band, in accordance with various aspects of the present disclosure.

FIG. 2 shows a wireless communication system 200 in which LTE/LTE-A may be deployed under different scenarios using a shared radio frequency spectrum band, in accordance with various aspects of the present disclosure. More specifically, FIG. 2 illustrates examples of a supplemental downlink mode (also referred to as a licensed assisted access mode), a carrier aggregation mode, and a standalone mode in which LTE/LTE-A is deployed using a shared radio frequency spectrum band. The wireless communication system 200 may be an example of portions of the wireless communication system 100 described with reference to FIG. 1. Moreover, a first base station 205 and a second base station 205-*a* may be examples of aspects of one or more of the base stations 105 described with reference to FIG. 1, while a first UE 215, a second UE 215-*a*, a third UE 215-*b*, and a fourth UE 215-*c* may be examples of aspects of one or more of the UEs 115 described with reference to FIG. 1.

In the example of a supplemental downlink mode (e.g., a licensed assisted access mode) in the wireless communication system 200, the first base station 205 may transmit OFDMA waveforms to the first UE 215 using a downlink channel 220. The downlink channel 220 may be associated with a frequency F1 in a shared radio frequency spectrum band. The first base station 205 may transmit OFDMA waveforms to the first UE 215 using a first bidirectional link 225 and may receive SC-FDMA waveforms from the first UE 215 using the first bidirectional link 225. The first bidirectional link 225 may be associated with a frequency F4 in a dedicated radio frequency spectrum band. The downlink channel 220 in the shared radio frequency spectrum band and the first bidirectional link 225 in the dedicated radio frequency spectrum band may operate contemporaneously. The downlink channel 220 may provide a downlink capacity offload for the first base station 205. In some examples, the downlink channel 220 may be used for unicast services (e.g., addressed to one UE) or for multicast services (e.g., addressed to several UEs). This scenario may occur with any service provider (e.g., a mobile network operator (MNO)) that uses a dedicated radio frequency spectrum and needs to relieve some of the traffic or signaling congestion.

In one example of a carrier aggregation mode in the wireless communication system 200, the first base station 205 may transmit OFDMA waveforms to the second UE 215-*a* using a second bidirectional link 230 and may receive OFDMA waveforms, SC-FDMA waveforms, or resource block interleaved FDMA waveforms from the second UE 215-*a* using the second bidirectional link 230. The second bidirectional link 230 may be associated with the frequency F1 in the shared radio frequency spectrum band. The first base station 205 may also transmit OFDMA waveforms to the second UE 215-a using a third bidirectional link 235 and may receive SC-FDMA waveforms from the second UE 215-a using the third bidirectional link 235. The third bidirectional link 235 may be associated with a frequency F2 in a dedicated radio frequency spectrum band. The second bidirectional link 230 may provide a downlink and uplink capacity offload for the first base station 205. Like the supplemental downlink mode (e.g., the licensed assisted access mode) described above, this scenario may occur with any service provider (e.g., MNO) that uses a dedicated radio frequency spectrum and needs to relieve some of the traffic or signaling congestion.

In another example of a carrier aggregation mode in the wireless communication system 200, the first base station 205 may transmit OFDMA waveforms to the third UE 215-b using a fourth bidirectional link 240 and may receive OFDMA waveforms, SC-FDMA waveforms, or resource block interleaved waveforms from the third UE 215-b using the fourth bidirectional link 240. The fourth bidirectional link 240 may be associated with a frequency F3 in the shared radio frequency spectrum band. The first base station 205 may also transmit OFDMA waveforms to the third UE 215-b using a fifth bidirectional link 245 and may receive SC-FDMA waveforms from the third UE 215-b using the fifth bidirectional link 245. The fifth bidirectional link 245 may be associated with the frequency F2 in the dedicated radio frequency spectrum band. The fourth bidirectional link 240 may provide a downlink and uplink capacity offload for the first base station 205. This example and those provided above are presented for illustrative purposes and there may be other similar modes of operation or deployment scenarios that combine LTE/LTE-A in a dedicated radio frequency spectrum band and use a shared radio frequency spectrum band for capacity offload.

As described above, one type of service provider that may benefit from the capacity offload offered by using LTE/LTE-A in a shared radio frequency spectrum band is a traditional MNO having access rights to an LTE/LTE-A dedicated radio frequency spectrum band. For these service providers, an operational example may include a bootstrapped mode (e.g., supplemental downlink, carrier aggregation) that uses the LTE/LTE-A primary component carrier (PCC) on the dedicated radio frequency spectrum band and at least one secondary component carrier (SCC) on the shared radio frequency spectrum band.

In the carrier aggregation mode, data and control may, for example, be communicated in the dedicated radio frequency spectrum band (e.g., via first bidirectional link 225, third bidirectional link 235, and fifth bidirectional link 245) while data may, for example, be communicated in the shared radio frequency spectrum band (e.g., via second bidirectional link 230 and fourth bidirectional link 240). The carrier aggregation mechanisms supported when using a shared radio frequency spectrum band may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second base station 205-a may transmit OFDMA waveforms to the fourth UE 215-c using a bidirectional link 250 and may receive OFDMA waveforms, SC-FDMA waveforms, or resource block interleaved FDMA waveforms from the fourth UE 215-c using the bidirectional link 250. The bidirectional link 250 may be associated with the frequency F3 in the shared radio frequency spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a dedicated radio frequency spectrum band.

In some examples, a transmitting apparatus such as one of the base stations 105, 205, or 205-a described with reference to FIG. 1 or 2, or one of the UEs 115, 215, 215-a, 215-b, or 215-c described with reference to FIG. 1 or 2, may use a gating interval to gain access to a channel of a shared radio frequency spectrum band (e.g., to a physical channel of the shared radio frequency spectrum band). In some examples, the gating interval may be periodic. For example, the periodic gating interval may be synchronized with at least one boundary of an LTE/LTE-A radio interval. The gating interval may define the application of a contention-based protocol, such as an LBT protocol based on the LBT protocol specified in European Telecommunications Standards Institute (ETSI) (EN 301 893). When using a gating interval that defines the application of an LBT protocol, the gating interval may indicate when a transmitting apparatus needs to perform a contention procedure (e.g., an LBT procedure) such as a clear channel assessment (CCA) procedure. The outcome of the CCA procedure may indicate to the transmitting apparatus whether a channel of a shared radio frequency spectrum band is available or in use for the gating interval (also referred to as an LBT radio frame). When a CCA procedure indicates that the channel is available for a corresponding LBT radio frame (e.g., "clear" for use), the transmitting apparatus may reserve or use the channel of the shared radio frequency spectrum band during part or all of the LBT radio frame. When the CCA procedure indicates that the channel is not available (e.g., that the channel is in use or reserved by another transmitting apparatus), the transmitting apparatus may be prevented from using the channel during the LBT radio frame.

Figure 3:
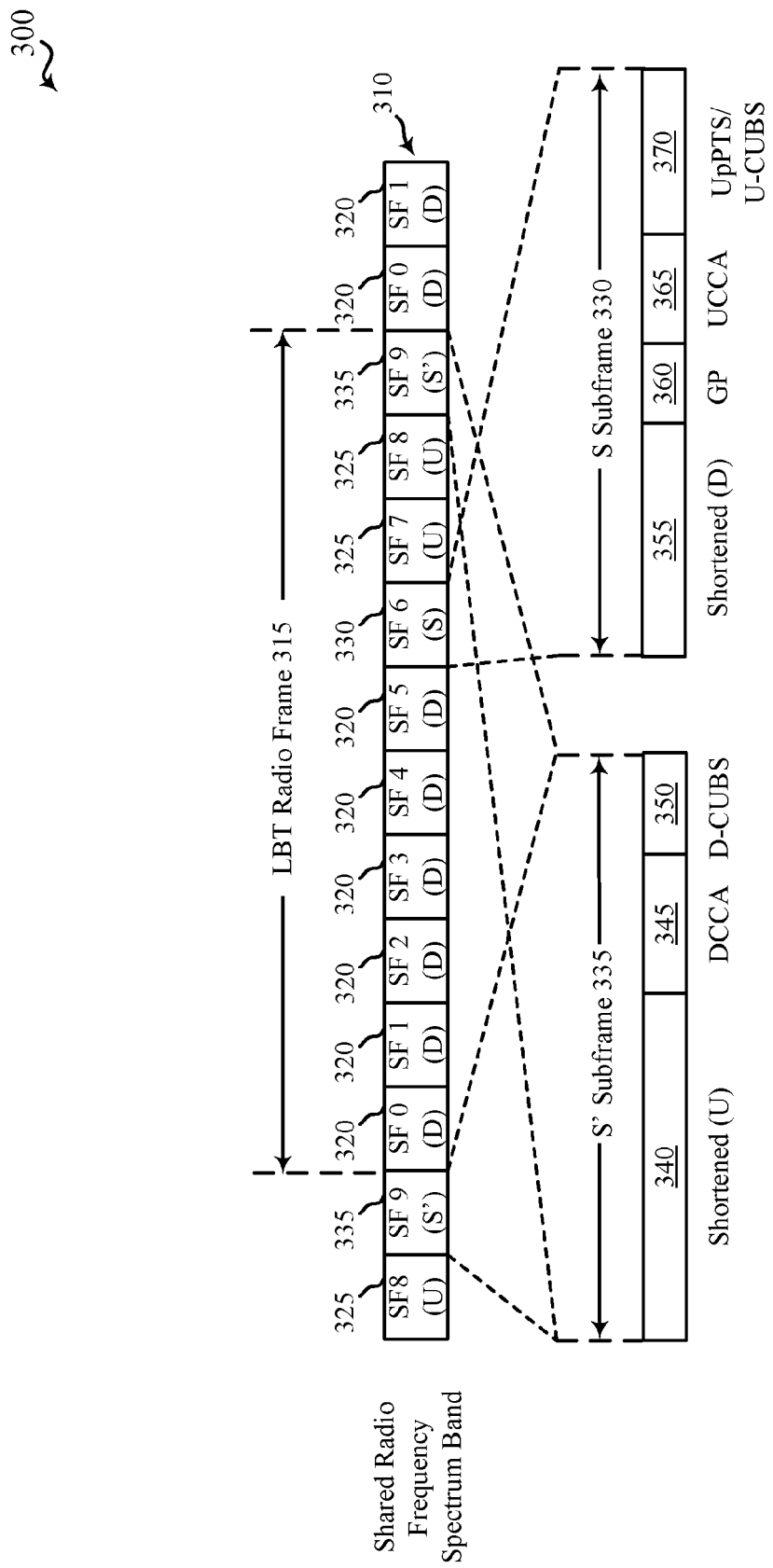
FIG. 3 shows an example of a wireless communication over a shared radio frequency spectrum band, in accordance with various aspects of the present disclosure.

FIG. 3 shows an example 300 of a wireless communication 310 over a shared radio frequency spectrum band, in accordance with various aspects of the present disclosure. In some examples, the wireless communication 310 may include a transmission of one or more uplink component carriers, which uplink component carrier(s) may be transmitted, for example, as part of a transmission made according to the supplemental downlink mode (e.g., the licensed assisted access mode), the carrier aggregation mode, or the standalone mode described with reference to FIG. 2, the carrier aggregation mode described with reference to FIG. 4, and/or the dual-connectivity mode described with referenced to FIG. 5.

In some examples, an LBT radio frame 315 of the wireless communication 310 may have a duration of ten milliseconds and include a number of downlink (D) subframes 320, a number of uplink (U) subframes 325, and two types of special subframes, an S subframe 330 and an S' subframe 335. The S subframe 330 may provide a transition between downlink subframes 320 and uplink subframes 325, while the S' subframe 335 may provide a transition between uplink subframes 325 and downlink subframes 320 and, in some examples, a transition between LBT radio frames.

During the S' subframe 335, a downlink clear channel assessment (DCCA) procedure 345 may be performed by one or more base stations, such as one or more of the base stations 105, 205, or 205-a described with reference to FIG. 1 or 2, to reserve, for a period of time, a channel of the shared radio frequency spectrum band over which the wireless communication 310 occurs. Following a successful DCCA procedure 345 by a base station, the base station may transmit a channel reservation signal (e.g., a channel usage beacon signal (CUBS), such as a downlink CUBS (D-CUBS 350)) to provide an indication to other base stations or apparatuses (e.g., UEs, Wi-Fi access points, etc.) that the base station has reserved the channel. In some examples, a D-CUBS 350 may be transmitted using a plurality of interleaved resource blocks. Transmitting a D-CUBS 350 in this manner may enable the D-CUBS 350 to occupy at least some percentage of the available frequency bandwidth of the shared radio frequency spectrum band and satisfy one or more regulatory requirements (e.g., a requirement that transmissions over the shared radio frequency spectrum band occupy at least 80% of the available frequency bandwidth). The D-CUBS 350 may in some examples take a form similar to that of an LTE/LTE-A common reference signal (CRS) or a channel state information reference signal (CSI-RS). When the DCCA procedure 345 fails, the D-CUBS 350 may not be transmitted.

The S' subframe 335 may include a plurality of OFDM symbol periods (e.g., 14 OFDM symbol periods). A first portion of the S' subframe 335 may be used by a number of UEs as a shortened uplink (U) period. A second portion of the S' subframe 335 may be used for the DCCA procedure 345. A third portion of the S' subframe 335 may be used by one or more base stations that successfully contend for access to the channel of the shared radio frequency spectrum band to transmit the D-CUBS 350.

During the S subframe 330, an uplink CCA (UCCA) procedure 365 may be performed by one or more UEs, such as one or more of the UEs 115, 215, 215-*a*, 215-*b*, or 215-*c* described above with reference to FIG. 1 or 2, to reserve, for a period of time, the channel over which the wireless communication 310 occurs. Following a successful UCCA procedure 365 by a UE, the UE may transmit a channel reservation signal (e.g., a CUBS, such as an uplink CUBS (U-CUBS 370)) to provide an indication to other UEs or apparatuses (e.g., base stations, Wi-Fi access points, etc.) that the UE has reserved the channel. In some examples, a U-CUBS 370 may be transmitted using a plurality of interleaved resource blocks. Transmitting a U-CUBS 370 in this manner may enable the U-CUBS 370 to occupy at least some percentage of the available frequency bandwidth of the shared radio frequency spectrum band and satisfy one or more regulatory requirements (e.g., the requirement that transmissions over the shared radio frequency spectrum band occupy at least 80% of the available frequency bandwidth). The U-CUBS 370 may in some examples take a form similar to that of an LTE/LTE-A CRS or CSI-RS. When the UCCA procedure 365 fails, the U-CUBS 370 may not be transmitted.

The S subframe 330 may include a plurality of OFDM symbol periods (e.g., 14 OFDM symbol periods). A first portion of the S subframe 330 may be used by a number of base stations as a shortened downlink (D) period 355. A second portion of the S subframe 330 may be used as a guard period (GP) 360. A third portion of the S subframe 330 may be used for the UCCA procedure 365. A fourth portion of the S subframe 330 may be used by one or more UEs that successfully contend for access to the channel of the shared radio frequency spectrum band as an uplink pilot time slot (UpPTS) or to transmit the U-CUBS 370.

In some examples, the DCCA procedure 345 or the UCCA procedure 365 may include the performance of a single CCA procedure. In other examples, the DCCA procedure 345 or the UCCA procedure 365 may include the performance of an extended CCA procedure. The extended CCA procedure may include a random number of CCA procedures, and in some examples may include a plurality of CCA procedures.

Figure 4A:
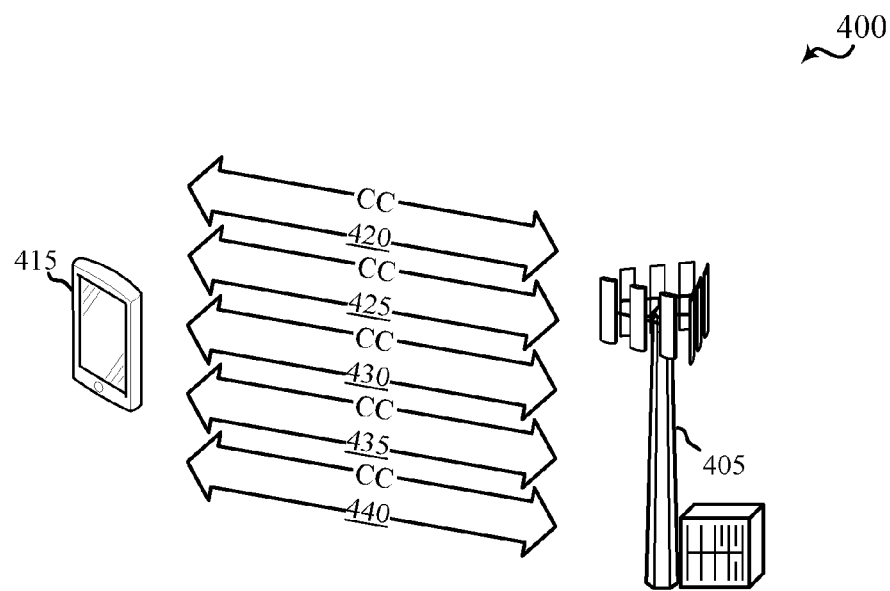
FIG. 4A shows a wireless communication system in which LTE/LTE-A may be deployed in a carrier aggregation scenario, in accordance with various aspects of the present disclosure.

FIG. 4A shows a wireless communication system 400 in which LTE/LTE-A may be deployed in a carrier aggregation scenario, in accordance with various aspects of the present disclosure. The wireless communication system 400 may be an example of portions of the wireless communication system 100 or 200 described with reference to FIG. 1 or 2. Moreover, a base station 405 may be an example of aspects of one or more of the base stations 105, 204, or 205-*a* described with reference to FIG. 1 or 2, while a UE 415 may be an examples of aspects of one or more of the UEs 115, 215, 215-*a*, 215-*b*, or 215-*c* described with reference to FIG. 1 or 2.

When communicating in a carrier aggregation mode using LTE/LTE-A communications, the UE 415 may communicate with the base station 405 using up to five component carriers (CCs). One of the CCs may be designated as a primary CC, and the remaining CCs may be designated as secondary CCs. Each CC may be configured as a DL CC, a UL CC, or a cell (e.g., a CC that may be configured for use as a DL CC and/or a UL CC). By way of example, FIG. 4A illustrates communication between the UE 415 and the base station 405 over five CCs, including a first CC 420, a second CC 425, a third CC 430, a fourth CC 435, and a fifth CC 440. Each of the first CC 420, the second CC 425, the third CC 430, the fourth CC 435, and the fifth CC 440 may operate in a dedicated radio frequency spectrum band or a shared radio frequency spectrum band, depending on how the CC is allocated or configured.

When the UE 415 is configured for operation in a supplemental downlink mode (e.g., a licensed assisted access mode) of operation using a shared radio frequency spectrum band, as described with reference to FIG. 2, and when the UE 415 is operating in a carrier aggregation mode, one or more of the first CC 420, the second CC 425, the third CC 430, the fourth CC 435, or the fifth CC 440 may operate as a UL CC or a DL CC in the dedicated radio frequency spectrum band, and one or more of the first CC 420, the second CC 425, the third CC 430, the fourth CC 435, or the fifth CC 440 may operate as a DL CC in the shared radio frequency spectrum band.

When the UE 415 is configured for operation in a carrier aggregation mode of operation using the shared radio frequency spectrum band, as described with reference to FIG. 2, one or more of the first CC 420, the second CC 425, the third CC 430, the fourth CC 435, or the fifth CC 440 may operate as a UL CC or a DL CC in the dedicated radio frequency spectrum band, and one or more of the first CC 420, the second CC 425, the third CC 430, the fourth CC 435, or the fifth CC 440 may operate as a DL CC or a UL CC in the shared radio frequency spectrum band. In some examples, all of the DL CCs may operate in the dedicated radio frequency spectrum band, or all of the UL CCs may operate in the shared radio frequency spectrum band, but not all of the DL CCs and all of the UL CCs may operate in the shared radio frequency spectrum band (e.g., at least one DL CC or at least UL CC operates in the dedicated radio frequency spectrum band).

When the UE 415 is configured for operation in a stand-alone mode of operation using the shared radio frequency spectrum band, as described with reference to FIG. 2, and when the UE 415 is operating in a carrier aggregation mode, each of the first CC 420, the second CC 425, the third CC 430, the fourth CC 435, and the fifth CC 440 may operate in the shared radio frequency spectrum band.

Figure 4B:
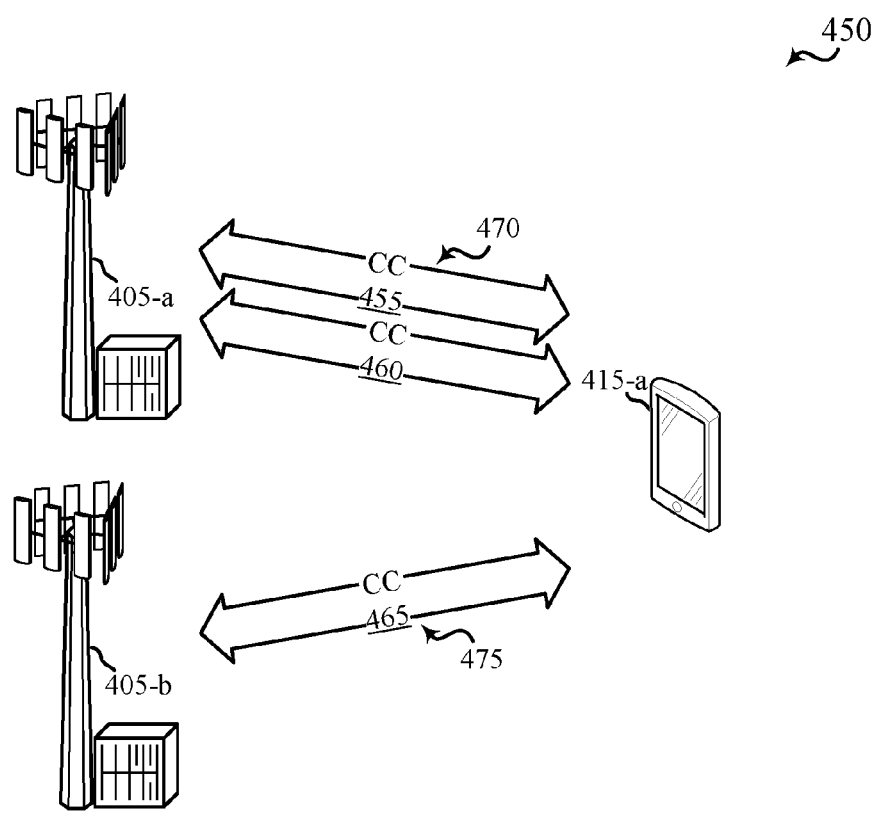
FIG. 4B shows a wireless communication system in which LTE/LTE-A may be deployed in a dual-connectivity scenario (e.g., a coordinated multipoint (CoMP) scenario), in accordance with various aspects of the present disclosure.

FIG. 4B shows a wireless communication system 450 in which LTE/LTE-A may be deployed in a dual-connectivity scenario (e.g., a coordinated multipoint (CoMP) scenario), in accordance with various aspects of the present disclosure. The wireless communication system 450 may be an example of portions of the wireless communication system 100 or 200 described with reference to FIG. 1 or 2. Moreover, a first base station 405-*a* and a second base station 405-*b* may be examples of aspects of one or more of the base stations 105, 205, 205-*a*, or 405 described with reference to FIG. 1, 2, or 4A, while a UE 415-*a* may be an examples of aspects of one or more of the UEs 115, 215, 215-*a*, 215-*b*, 215-*c*, or 415 described with reference to FIG. 1, 2, or 4A.

When communicating in a dual-connectivity mode using LTE/LTE-A communications, the UE 415-*a* may communicate with multiple base stations, such as the first base station 405-*a* and the second base station 405-*b*, using up to five CCs. One of the CCs may be designated as a primary CC, and the remaining CCs may be designated as secondary CCs. Each CC may be configured as a DL CC, a UL CC, or a cell (e.g., a CC that may be configured for use as a DL CC and/or a UL CC). By way of example, FIG. 4B illustrates communication between the UE 415-*a* and the base station 405-*a* over three CCs, including a first CC 455, a second CC 460, and a third CC 465. In some examples, the first CC 455 and the second CC 460 (in communication with the first base station 405-*a*) may be configured as a primary group of CCs 470 in a dual-connectivity operation, and the third CC 465 (in communication with the second base station 405-*b*) may be configured as a secondary group of CCs 475 (e.g., in this example, a group of one) in the dual-connectivity operation. The first CC 455, the second CC 460, and the third CC 465 may be configured for various modes of operation using a dedicated radio frequency spectrum band or a shared radio frequency spectrum band, similarly to how component carriers may be used in a carrier aggregation mode of operation, as described, for example, with reference to FIG. 4A.

In examples of the wireless communication system 100, 200, 400, or 450 described with reference to FIG. 1, 2, 4A, or 4B in which base stations and UEs communicate over a shared radio frequency spectrum band, there may be times when a base station or UE wins contention for access to the shared radio frequency spectrum band after a subframe boundary has passed. In these examples, the base station or UE may transmit a channel reservation signal (e.g., a CUBS) until a next subframe boundary, or the base station or UE may schedule and transmit data during a partial subframe (i.e., a part of a subframe that begins after a leading subframe boundary and after winning contention for access to the shared radio frequency spectrum band, and that ends at the arrival of a next (or trailing) subframe boundary). The duration of a partial subframe may depend on when a base station or UE wins contention for access to the shared radio frequency spectrum band, and may include, for example, one symbol period (e.g., one OFDM symbol period), or a plurality of symbol periods. Some partial subframes (e.g., a half-slot partial subframe) may have too short a duration or be associated with too few resources to be useful (e.g., the partial subframe may be too short for both the control portion and the data portion of the transmission). Other partial subframes (e.g., a one slot partial subframe) may be useful but for the fact that a control portion of a transmission would use too many (or all) of the partial subframe's resources, or be inefficient because the control portion of the transmission would use such a great percentage of the partial subframe's resources. Techniques described in the present disclosure may increase the usefulness or efficiency of partial subframes, for example, by transmitting a semi-static partial subframe configuration in advance of a partial subframe transmission, in order to decrease the size of the control portion of a partial subframe. Described techniques may also increase the usefulness or efficiency of a partial subframe by encoding or transmitting a partial subframe differently than a full subframe. Still further, described techniques may increase the usefulness or efficiency of a partial subframe by scaling the amount of resources allocated to a control portion of the transmission of the partial subframe based on the amount of resources allocated (or available) in the partial subframe. Described techniques may also increase the usefulness or efficiency of a partial subframe by decoupling the scheduling of partial subframes from the scheduling of full subframes (e.g., scheduling the partial subframes and/or the full subframes from different component carriers).

Also in examples of the wireless communication system 100, 200, 400, or 450 described with reference to FIG. 1, 2, 4A, or 4B in which base stations and UEs communicate over a shared radio frequency spectrum band, there may be times when a UE has to monitor a plurality of symbol periods for a channel reservation signal and a CRS, to determine when a base station wins contention for access to the shared radio frequency spectrum band, and to determine when the base station is ready to begin a transmission over the shared radio frequency spectrum band (e.g., a partial subframe transmission). When a channel reservation signal is a cyclically extended version of a CRS (e.g., a CRS transmitted during the last symbol period of a subframe), it can be ambiguous as to when a channel reservation signal or a CRS is being transmitted. Techniques described in the present disclosure may remove this ambiguity and/or signal when a partial subframe transmission is about to be made.

In examples of the wireless communication system 100, 200, 400, or 450 described with reference to FIG. 1, 2, 4A, or 4B in which base stations and UEs communicate over a shared radio frequency spectrum band, there may also be times when a frame period may configured in accordance with one of a large number of downlink-uplink transmission configurations. A large number of bits may therefore be needed to signal a downlink-uplink transmission configuration for a frame period. The transmission of a large number of bits to signal a downlink-uplink transmission configuration may be inefficient. Because the downlink-uplink transmission configurations used over a time period of moderate length may be a relatively small subset of the possible downlink-uplink transmission configurations, techniques described in the present disclosure enable a base station to identify a subset of downlink-uplink transmission configurations from which the base station may select one or more downlink-uplink transmission configurations over one or more frame periods. Such techniques can reduce overhead associated with signaling downlink-uplink transmission configurations.

Still further in examples of the wireless communication system 100, 200, 400, or 450 described with reference to FIG. 1, 2, 4A, or 4B in which base stations and UEs communicate over a shared radio frequency spectrum band, there may be times when a UE may be unable to identify a RACH (or PRACH) occasion on a SCC. For example, the indication of a RACH occasion may not be standardized, or the UE may not be able to determine the downlink-uplink transmission configuration due to the UE being out of alignment with an SCell that is non-co-located with the UE's PCell. Because knowledge of a RACH occasion may be needed for timing synchronization, techniques described in the present disclosure enable a UE to identify a RACH occasion and RACH resources.

Described techniques described in the present disclosure may also enable a base station to signal an uplink only mode. In the uplink only mode, a base station may contend for access to shared radio frequency spectrum band on behalf of a UE and enable the UE to begin an uplink transmission upon receiving a channel reservation signal from the base station (e.g., without contending for access to the shared radio frequency spectrum band at the UE). The uplink only mode may be similar to a Wi-Fi uplink multiuser (UL-MU) mode, where an access point transmits a grant and Wi-Fi stations start transmitting without sensing the availability of a channel.

Still further in examples of the wireless communication system 100, 200, 400, or 450 described with reference to FIG. 1, 2, 4A, or 4B in which base stations and UEs communicate over a shared radio frequency spectrum band, there may be times when it would be useful for a UE to know whether its serving cells are co-located or non-co-located. Techniques described in the present disclosure therefore provide indications of whether serving cells are co-located.

Figure 5:
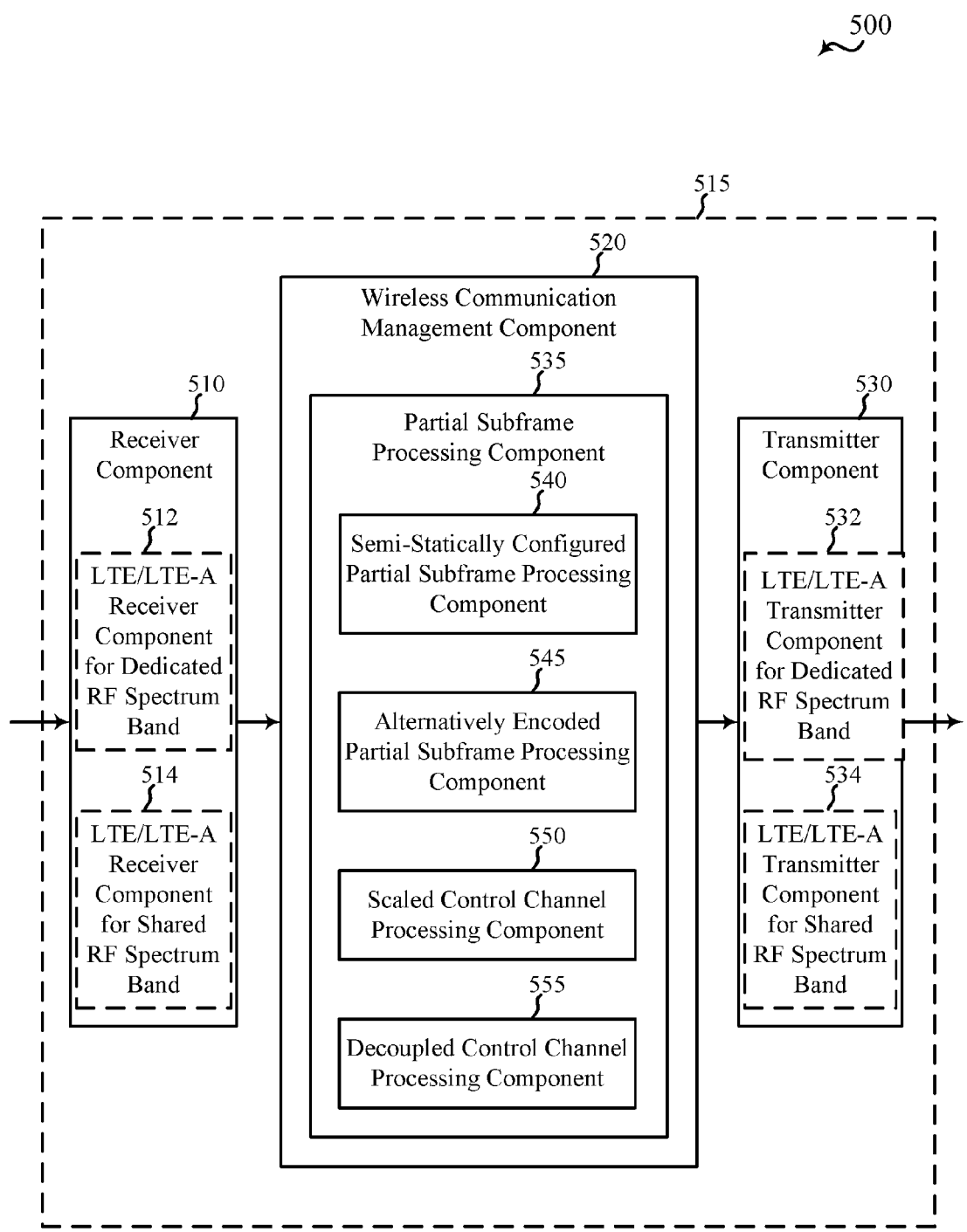
FIG. 5 shows a block diagram of an apparatus for use in wireless communication, in accordance with various aspects of the present disclosure.

FIG. 5 shows a block diagram 500 of an apparatus 515 for use in wireless communication, in accordance with various aspects of the present disclosure. The apparatus 515 may be an example of aspects of one or more of the UEs 115, 215, 215-a, 215-b, 215-c, 415, or 415-a described with reference to FIG. 1, 2, 4A, or 4B. The apparatus 515 may also be or include a processor. The apparatus 515 may include a receiver component 510, a wireless communication management component 520, or a transmitter component 530. Each of these components may be in communication with each other.

The components of the apparatus 515 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), a System on Chip (SoC), and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver component 510 may include at least one radio frequency (RF) receiver, such as at least one RF receiver operable to receive transmissions over a dedicated radio frequency spectrum band (e.g., a radio frequency spectrum band for which transmitting apparatuses may not contend for access because the radio frequency spectrum band is licensed to some users for some uses (e.g., a licensed radio frequency spectrum band usable for LTE/LTE-A communications)) or a shared radio frequency spectrum band (e.g., a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner)). In some examples, the dedicated radio frequency spectrum band or the shared radio frequency spectrum band may be used for LTE/LTE-A communications, as described, for example, with reference to FIG. 1 or 2. The receiver component 510 may in some cases include separate receivers for the dedicated radio frequency spectrum band and the shared radio frequency spectrum band. The separate receivers may, in some examples, take the form of an LTE/LTE-A receiver component for communicating over the dedicated radio frequency spectrum band (e.g., LTE/LTE-A receiver component for dedicated RF spectrum band 512), and an LTE/LTE-A receiver component for communicating over the shared radio frequency spectrum band (e.g., LTE/LTE-A receiver component for shared RF spectrum band 514). The receiver component 510, including the LTE/LTE-A receiver component for dedicated RF spectrum band 512 or the LTE/LTE-A receiver component for shared RF spectrum band 514, may be used to receive various types of data or control signals (i.e., transmissions) over one or more communication links of a wireless communication system, such as one or more communication links of the wireless communication system 100, 200, 400, or 450 described with reference to FIG. 1, 2, 4A, or 4B. The communication links may be established over the dedicated radio frequency spectrum band or the shared radio frequency spectrum band.

In some examples, the transmitter component 530 may include at least one RF transmitter, such as at least one RF transmitter operable to transmit over the dedicated radio frequency spectrum band or the shared radio frequency spectrum band. The transmitter component 530 may in some cases include separate transmitters for the dedicated radio frequency spectrum band and the shared radio frequency spectrum band. The separate transmitters may, in some examples, take the form of an LTE/LTE-A transmitter component for communicating over the dedicated radio frequency spectrum band (e.g., LTE/LTE-A transmitter component for dedicated RF spectrum band 532), and an LTE/LTE-A transmitter component for communicating over the shared radio frequency spectrum band (e.g., LTE/LTE-A transmitter component for shared RF spectrum band 534). The transmitter component 530, including the LTE/LTE-A transmitter component for dedicated RF spectrum band 532 or the LTE/LTE-A transmitter component for shared RF spectrum band 534, may be used to transmit various types of data or control signals (i.e., transmissions) over one or more communication links of a wireless communication system, such as one or more communication links of the wireless communication system 100, 200, 400, or 450 described with reference to FIG. 1, 2, 4A, or 4B. The communication links may be established over the dedicated radio frequency spectrum band or the shared radio frequency spectrum band.

In some examples, the wireless communication management component 520 may be used to manage one or more aspects of wireless communication for the apparatus 515. In some examples, the wireless communication management component 520 may include a partial subframe processing component 535. In some examples, the partial subframe processing component 535 may include a semi-statically configured partial subframe processing component 540, an alternatively encoded partial subframe processing component 545, a scaled control channel processing component 550, or a decoupled control channel processing component 555.

The semi-statically configured partial subframe processing component 540 may be used to receive a semi-static partial subframe configuration and a corresponding partial subframe identifier (e.g., a partial subframe RNTI). In some examples, the semi-static partial subframe configuration may be received in a RRC message (e.g., from a base station). In some examples, the semi-static partial subframe configuration may include at least a RB allocation type, or a RB allocation, or a transmission rank, or a MCS, or a TBS table, or a combination thereof. In some examples, the semi-static partial subframe configuration may include at least one of a TDM configuration or a FDM configuration. In some examples, the semi-static partial subframe configuration may be for a partial subframe occurring at a beginning of a subframe or at an end of a subframe. In some examples, the semi-static partial subframe configuration may be transmitted to one or a small number of UEs (e.g., because of the limited number of resources that may be available for allocation in a partial subframe).

In some examples, the semi-static partial subframe configuration may indicate a type of partial subframe to which the semi-static partial subframe configuration applies. In some examples, the type of partial subframe may be based at least in part on a length of partial subframe. For example, the semi-static partial subframe configuration may indicate that it applies to partial subframes having a duration of seven symbol periods (e.g., seven OFDM symbol periods). Other semi-static partial subframe configurations may be received for other types of partial subframes (e.g., partial subframes having durations of four symbol periods or ten symbol periods). Partial subframes of shorter duration may be associated with lower transmission rank configurations (e.g., rank 1 or 2) due to limitations on the DMRS available for demodulation).

The semi-statically configured partial subframe processing component 540 may also be used to receive an indication of at least one of: a number of partial subframes to which the semi-static partial subframe configuration applies; a number of downlink bursts to which the semi-static partial subframe configuration applies; a time duration to which the semi-static partial subframe configuration applies; or an indication that the semi-static partial subframe configuration applies until an alternative indication is received. In some examples, the indication may be received with the semi-static partial subframe configuration.

The semi-statically configured partial subframe processing component 540 may also be used to receive a grant for a partial subframe. The grant may identify the partial subframe identifier. In some examples, the grant may be received over a dedicated radio frequency spectrum band. In some examples, the grant may be received over a PCC (e.g., in the dedicated radio frequency spectrum band or in the shared radio frequency spectrum band). In some examples, the grant may include a HARQ ID, or a retransmission index, or a new data indicator (NDI), or a combination thereof. At least in part because of the semi-static partial subframe configuration, the received grant may use fewer resources than a grant received for a full subframe.

Still further, the semi-statically configured partial subframe processing component 540 may be used to receive a dynamic partial subframe configuration. In some examples, the dynamic partial subframe configuration may be received with the grant.

The semi-statically configured partial subframe processing component 540 may also be used to receive data scheduled for the partial subframe over the shared radio frequency spectrum band based at least in part on the semi-static partial subframe configuration. When a dynamic partial subframe configuration is received, the data scheduled for the partial subframe may also be received based at least in part on the dynamic partial subframe configuration.

In some examples, the semi-statically configured partial subframe processing component 540 may be used to receive data scheduled for a plurality of partial subframes over the shared radio frequency spectrum band based at least in part on the semi-static partial subframe configuration. For example, data may be received for an indicated number of partial subframes, number of downlink bursts, or time duration, or until an alternative indication (e.g., a different semi-static partial subframe configuration) is received. In some examples, a single received grant may apply to the plurality of partial subframes or a subset thereof.

In some examples, the data by the semi-statically configured partial subframe processing component 540 may correspond to an initial data transmission, and when the data cannot be decoded, or when receipt of the data is NAK'd, the wireless communication management component 520 may receive a retransmission of the data initially transmitted in the partial subframe in at least one full subframe (e.g., in some examples, data that is initially scheduled for transmission in a partial subframe may not be scheduled for retransmission in a partial subframe).

The alternatively encoded partial subframe processing component 545 may be used to receive first data scheduled for a partial subframe over the shared radio frequency spectrum band. The partial subframe may include a portion of a subframe encoded as a full subframe.

The alternatively encoded partial subframe processing component 545 may also be used to receive second data scheduled for a full subframe over the shared radio frequency spectrum band, where the first data and the second data are encoded differently.

In some examples, the first data may be encoded using at least one of a first MCS or a first TBS that is lower than a second MCS or a second TBS supported by a channel quality of a channel over which the first data is received (e.g., the first MCS or the first TBS may be selected more conservatively than the second MCS or the second TBS). The first MCS and/or first TBS may increase a UE's likelihood of being able to decode the first data, thereby decreasing the likelihood that the first data may need to be retransmitted. In some examples, the first data may include a portion of data encoded for a full subframe. When the data for the full subframe includes redundancies, a UE may be able to receive and properly decode the first data despite receiving just a portion of the data.

The scaled control channel processing component 550 may be used to receive a control channel of a partial subframe over the shared radio frequency spectrum band. A first amount of resources allocated to the control channel may be based at least in part on a second amount of resources allocated to the partial subframe. In some examples, the control channel may include an EPDCCH. In some examples, the first amount of resources may include an amount of frequency resources, such as an amount of resource blocks. In some examples, the amount of frequency resources may be scaled higher when the second amount of resources allocated to the partial subframe includes a lower amount of time resources, and the amount of frequency resources may be scaled lower when the second amount of resources allocated to the partial subframe includes a higher amount of time resources.

In some examples, the first amount of resources may include five resource blocks when the partial subframe has a duration of ten symbol periods (e.g., when the second amount of resources includes ten symbol periods); the first amount of resources may include six or eight resource blocks when the partial subframe has a duration of seven symbol periods (e.g., a duration of a half subframe or one slot); and the first amount of resources may include ten resource blocks when the partial subframe has a duration of four symbol periods. The first amount of resources may include four resource blocks when the second amount of resources includes fourteen symbol periods (e.g., a full subframe). In some examples, the symbol periods may be OFDM symbol periods.

The decoupled control channel processing component 555 may be used to receive same-carrier scheduling for a partial subframe transmitted over the shared radio frequency spectrum band (e.g., the partial subframe may be self-scheduled). In some examples, the same-carrier scheduling may be received on an EPDCCH.

The decoupled control channel processing component 555 may also be used to receive one of the same-carrier scheduling or cross-carrier scheduling for a full subframe received over the shared radio frequency spectrum band. In some examples, the same-carrier scheduling for a full subframe may be received on an EPDCCH. In some examples, the cross-carrier scheduling may be received on a PCC in a dedicated radio frequency spectrum band. In these examples, the cross-carrier scheduling may be received on a PDCCH. In other examples, the cross-carrier scheduling may be received on a SCC in the shared radio frequency spectrum band or the dedicated radio frequency spectrum band. In these examples, the cross-carrier scheduling may be received on an EPDCCH (in the shared radio frequency spectrum band) or a PDCCH (in the dedicated radio frequency spectrum band).

Figure 6:
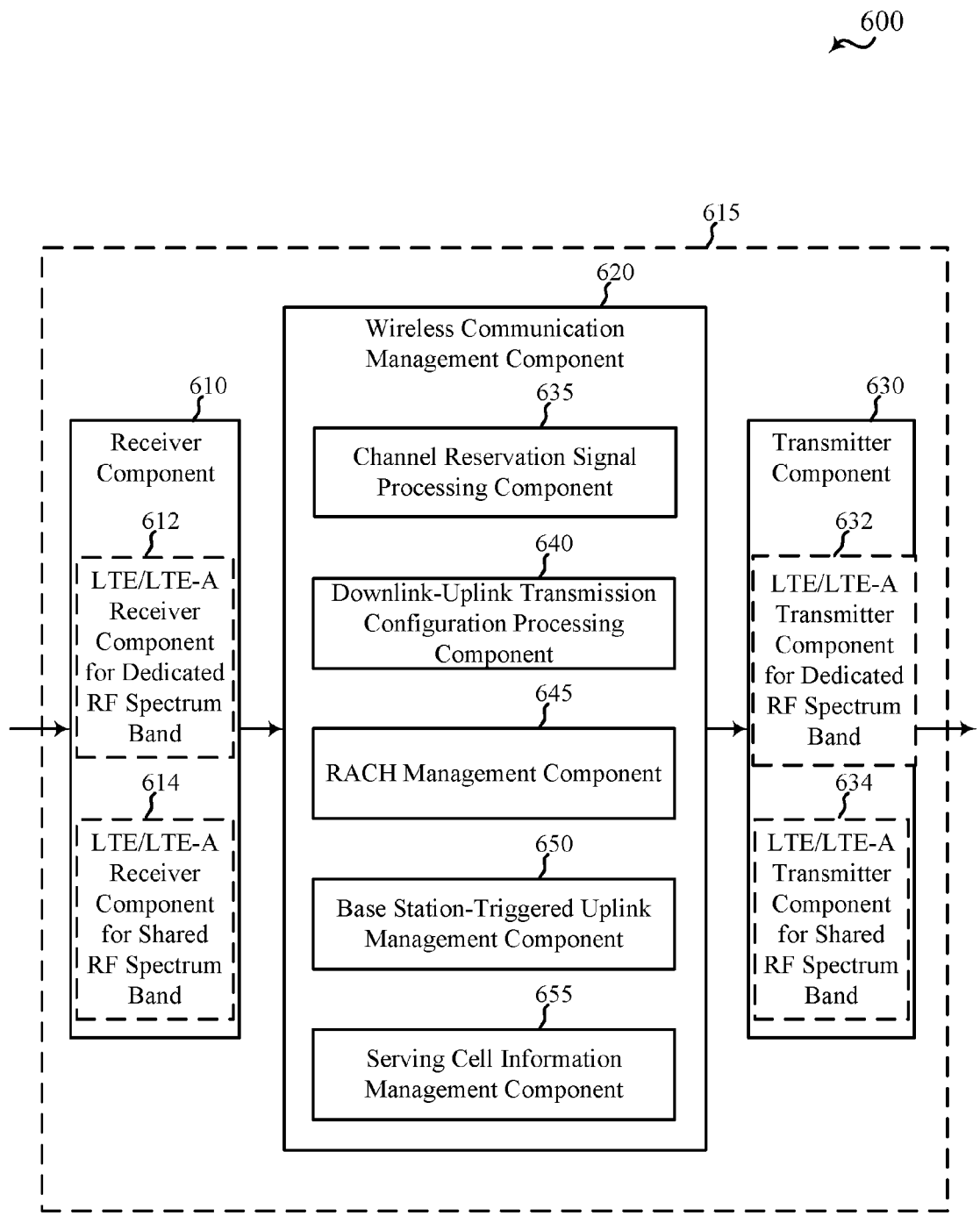
FIG. 6 shows a block diagram of an apparatus for use in wireless communication, in accordance with various aspects of the present disclosure.

FIG. 6 shows a block diagram 600 of an apparatus 615 for use in wireless communication, in accordance with various aspects of the present disclosure. The apparatus 615 may be an example of aspects of one or more of the UEs 115, 215, 215-a, 215-b, 215-c, 415, or 415-a described with reference to FIG. 1, 2, 4A, or 4B, or aspects of the apparatus 515 described with reference to FIG. 5. The apparatus 615 may also be or include a processor. The apparatus 615 may include a receiver component 610, a wireless communication management component 620, or a transmitter component 630. Each of these components may be in communication with each other.

The components of the apparatus 615 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver component 610 may include at least one RF receiver, such as at least one RF receiver operable to receive transmissions over a dedicated radio frequency spectrum band (e.g., a radio frequency spectrum band for which transmitting apparatuses may not contend for access because the radio frequency spectrum band is licensed to some users for some uses (e.g., a licensed radio frequency spectrum band usable for LTE/LTE-A communications)) or a shared radio frequency spectrum band (e.g., a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner)). In some examples, the dedicated radio frequency spectrum band or the shared radio frequency spectrum band may be used for LTE/LTE-A communications, as described, for example, with reference to FIG. 1 or 2. The receiver component 610 may in some cases include separate receivers for the dedicated radio frequency spectrum band and the shared radio frequency spectrum band. The separate receivers may, in some examples, take the form of an LTE/LTE-A receiver component for communicating over the dedicated radio frequency spectrum band (e.g., LTE/LTE-A receiver component for dedicated RF spectrum band 612), and an LTE/LTE-A receiver component for communicating over the shared radio frequency spectrum band (e.g., LTE/LTE-A receiver component for shared RF spectrum band 614). The receiver component 610, including the LTE/LTE-A receiver component for dedicated RF spectrum band 612 or the LTE/LTE-A receiver component for shared RF spectrum band 614, may be used to receive various types of data or control signals (i.e., transmissions) over one or more communication links of a wireless communication system, such as one or more communication links of the wireless communication system 100, 200, 400, or 450 described with reference to FIG. 1, 2, 4A, or 4B. The communication links may be established over the dedicated radio frequency spectrum band or the shared radio frequency spectrum band.

In some examples, the transmitter component 630 may include at least one RF transmitter, such as at least one RF transmitter operable to transmit over the dedicated radio frequency spectrum band or the shared radio frequency spectrum band. The transmitter component 630 may in some cases include separate transmitters for the dedicated radio frequency spectrum band and the shared radio frequency spectrum band. The separate transmitters may, in some examples, take the form of an LTE/LTE-A transmitter component for communicating over the dedicated radio frequency spectrum band (e.g., LTE/LTE-A transmitter component for dedicated RF spectrum band 632), and an LTE/LTE-A transmitter component for communicating over the shared radio frequency spectrum band (e.g., LTE/LTE-A transmitter component for shared RF spectrum band 634). The transmitter component 630, including the LTE/LTE-A transmitter component for dedicated RF spectrum band 632 or the LTE/LTE-A transmitter component for shared RF spectrum band 634, may be used to transmit various types of data or control signals (i.e., transmissions) over one or more communication links of a wireless communication system, such as one or more communication links of the wireless communication system 100, 200, 400, or 450 described with reference to FIG. 1, 2, 4A, or 4B. The communication links may be established over the dedicated radio frequency spectrum band or the shared radio frequency spectrum band.

In some examples, the wireless communication management component 620 may be used to manage one or more aspects of wireless communication for the apparatus 615. In some examples, the wireless communication management component 620 may include a channel reservation signal processing component 635, a downlink-uplink transmission configuration processing component 640, a RACH management component 645, a base station-triggered uplink management component 650, or a serving cell information management component 655.

The channel reservation signal processing component 635 may be used to monitor a plurality of symbol periods (e.g., OFDM symbol periods of a subframe) for at least one channel reservation signal transmitted over the shared radio frequency spectrum band. The at least one channel reservation signal may be encoded based at least in part on each symbol period of the plurality of symbol periods. In some examples, the at least one channel reservation signal may include at least one D-CUBS.

In some examples, the at least one channel reservation signal transmitted over the shared radio frequency spectrum band may include a channel reservation signal encoded based on a number of symbol periods for which the channel reservation signal is transmitted. Thus, a first encoding of a first channel reservation signal transmitted for two symbol periods may differ from a second encoding of a second channel reservation signal transmitted for one symbol period. A channel reservation signal may be transmitted for one of a plurality of different durations based, for example, on the symbol period in which a base station wins contention for access to the shared radio frequency spectrum band and begins transmitting the channel reservation signal.

In some examples, the at least one channel reservation signal transmitted over the shared radio frequency spectrum band may include a plurality of channel reservation signals transmitted in different contiguous symbol periods of the plurality of symbol periods. In these examples, an encoding of a first channel reservation signal received in a first symbol period of the plurality of symbol periods may differ from an encoding of a second channel reservation signal received in a second symbol period of the plurality of symbol periods. In some examples, the encoding of each channel reservation signal may differ. In other examples, the channel reservation signals transmitted in different symbol periods may be scrambled with different seeds.

The channel reservation signal processing component 635 may also be used to monitor for a CRS transmitted between the at least one channel reservation signal and a subsequent downlink transmission. Each of the at least one channel reservation signal may be encoded differently than the CRS. In some examples, the different encoding(s) may include a different sequence scrambling (or sequence scramblings).

Still further, the channel reservation signal processing component 635 may be used to receive a downlink transmission over the shared radio frequency spectrum band. The downlink transmission may follow the at least one channel reservation signal. In some examples, the downlink transmission may include data scheduled for a partial subframe.

The downlink-uplink transmission configuration processing component 640 may be used to receive a first indication of a subset of a plurality of downlink-uplink transmission configurations of a frame period (i.e., a subset of less than all of the possible downlink-uplink transmission configurations of the frame period). In some examples, the subset of the plurality of downlink-uplink transmission configurations may include at least one partial subframe configuration. In some examples, the first indication of the subset of downlink-uplink transmission configurations may be received in a RRC message.

The downlink-uplink transmission configuration processing component 640 may also be used to receive a second indication of a downlink-uplink transmission configuration included in the subset of the plurality of downlink-uplink transmission configurations. In some examples, the second indication may be similar to an eIMTA configuration. In some examples, the second indication may indicate (and thus, the subset of the plurality of downlink-uplink transmission configurations may include) a downlink-uplink configuration comprising at least one of: a plurality of downlink bursts, or a plurality of uplink bursts, or a plurality of downlink bursts and at least one uplink burst, or a plurality of uplink bursts and at least one downlink burst, or a combination thereof. In some examples, the second indication may indicate a downlink-uplink configuration including a sequence of alternating downlink bursts and uplink bursts. In some examples, the second indication may be received on a PFFICH.

The downlink-uplink transmission configuration processing component 640 may also be used to receive a downlink transmission over the shared radio frequency spectrum band according to the indicated downlink-uplink transmission configuration. In some examples, at least one of the downlink bursts or uplink bursts of the downlink transmission may be separated from other downlink bursts or other uplink bursts by a transmission gap. In some examples, the transmission gap may include a number of CCA occasions (e.g., one or more CCA occasions).

In some examples, the downlink-uplink transmission configuration processing component 640 may be used to determine the shared radio frequency spectrum band is available prior to receiving the downlink transmission, and may refrain from determining the shared radio frequency spectrum band is available again until after the downlink transmission. In some examples, determining the shared radio frequency spectrum band is available may include receiving at least one channel reservation signal (e.g., at least one D-CUB S) from a base station and/or by the wireless communication management component 620 performing a CCA procedure.

The RACH management component 645 may be used to transmit, on a PCC, a request for RACH resources on a SCC. In some examples, the request for RACH resources on the SCC may be transmitted at least one of: in a PHY signal, in a SR, in a MAC control element, or multiplexed with UCI.

The RACH management component 645 may also be used to receive, in response to transmitting the request for RACH resources on the SCC, an indication of a RACH occasion and an indication of the RACH resources on the SCC. In some examples, the PCC may be in one of a dedicated radio frequency spectrum band or a shared radio frequency spectrum band, and the SCC may be in the shared radio frequency spectrum band.

The base station-triggered uplink management component 650 may be used to receive a channel reservation signal from a base station over a shared radio frequency spectrum band. In some examples, the channel reservation signal may include a D-CUBS. In some examples, the channel reservation signal may include a PFFICH indicating an uplink only mode.

In some examples, the channel reservation signal may be transmitted by a base station that accesses the shared radio frequency spectrum band, performs a CCA procedure, and determines the shared radio frequency spectrum band is available just before an uplink transmission is to be made by the apparatus 615. In some examples, the base station may transmit the channel reservation signal without any downlink data or other reference signal, and when feasible enter a sleep state. In other examples, the channel reservation signal may include a PFFICH identifying a beginning of an uplink only mode.

The base station-triggered uplink management component 650 may also be used to begin an uplink transmission to the base station, over the shared radio frequency spectrum band, upon receiving the channel reservation signal and without contending for access to the shared radio frequency spectrum band. In some examples, the uplink transmission may be preceded by another uplink transmission.

The serving cell information management component 655 may be used to receive, from a base station, an indication of whether a first serving cell and a second serving cell are co-located. In some examples, the base station may obtain and transmit the indication when the first serving cell and the second serving cell are co-located, or when the first serving cell and the second serving cell are connected by an ideal (e.g., low latency) backhaul.

The serving cell information management component 655 may also be used to determine whether the first serving cell and the second serving cell are co-located. In some examples, the first serving cell and the second serving cell may belong to the same timing advance group (TAG) but may not be co-located.

Based at least in part on receiving an indication that the first serving cell and the second serving cell are co-located the serving cell information management component 655 may use information of the first serving cell to determine information of the second serving cell. In some examples, the information of the first serving cell may include at least one of a first time tracking, a first frequency tracking, a first Doppler tracking, or a first path loss measurement, and the information of the second serving cell may include at least one of a second time tracking, a second frequency tracking, a second Doppler tracking, or a second path loss measurement.

In some examples, the serving cell information management component 655 may use a determination that the first serving cell and the second serving cell are not co-located to prevent degradation due to information sharing between the first serving cell and the second serving cell.

In some examples, one or both of the first serving cell and the second serving cell may communicate with the apparatus 615 over the dedicated radio frequency spectrum band, or one or both of the first serving cell and the second serving cell may communicate with the apparatus 615 over the shared radio frequency spectrum band. In some examples, one of the first serving cell and the second serving cell may be a PCell for the apparatus 615, and the other of the first serving cell and the second serving cell may be a SCell for the apparatus 615. In other examples, at least one of the first serving cell and the second serving cell may be an SCell for the apparatus 615.

In some examples, the serving cell information management component 655 may receive an indication of whether serving cells are co-located for each pair of serving cells for the apparatus 615. Alternatively, the serving cell information management component 655 may receive a list (or lists) of co-located serving cells for the apparatus 615.

Figure 7:
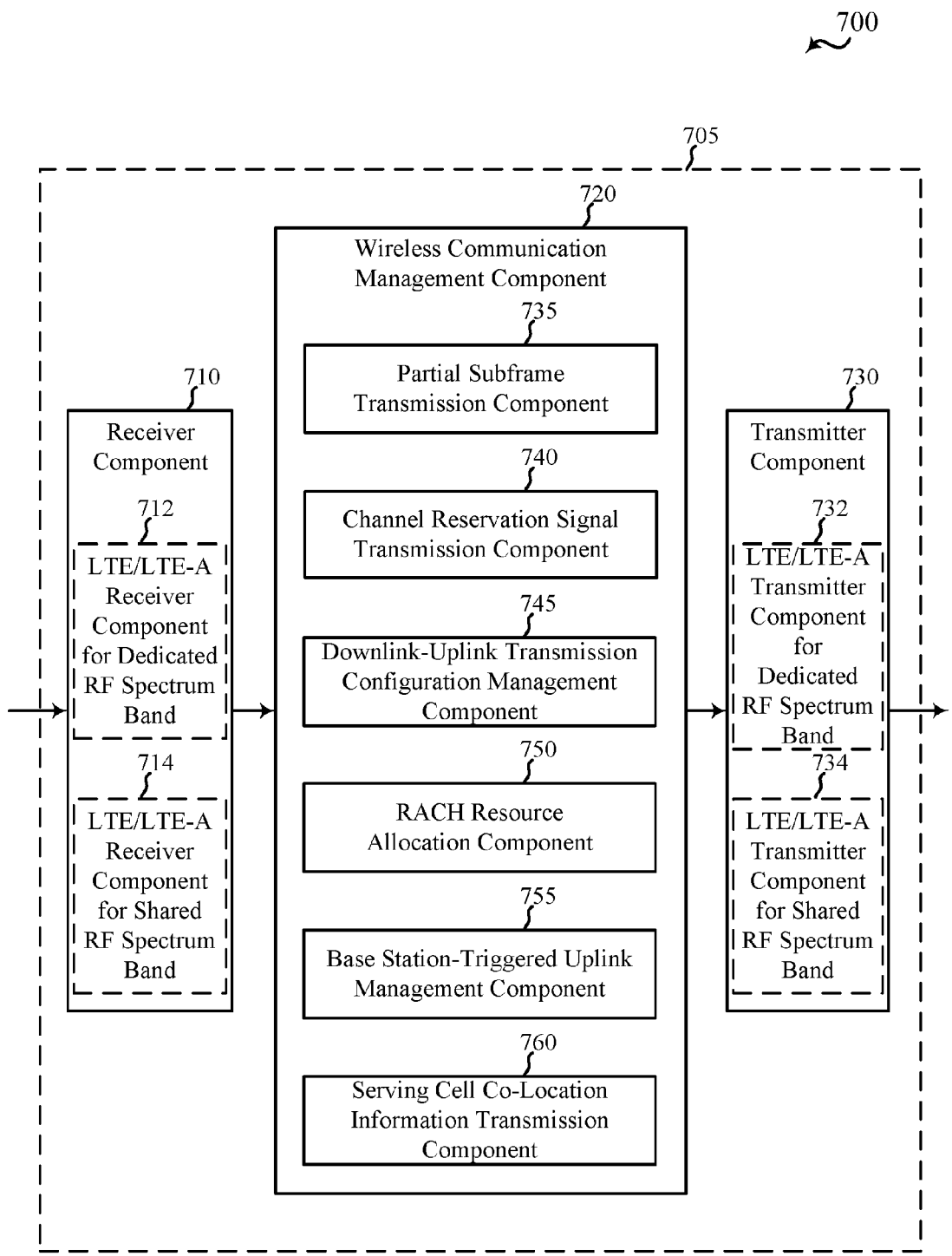
FIG. 7 shows a block diagram of an apparatus for use in wireless communication, in accordance with various aspects of the present disclosure.

FIG. 7 shows a block diagram 700 of an apparatus 705 for use in wireless communication, in accordance with various aspects of the present disclosure. The apparatus 705 may be an example of aspects of one or more of the base stations 105, 205, 205-*a*, 405, 405-*a*, or 405-*b* described with reference to FIG. 1, 2, 4A, or 4B. The apparatus 705 may also be or include a processor. The apparatus 705 may include a receiver component 710, a wireless communication management component 720, or a transmitter component 730. At least one of these components may be in communication with each other.

The components of the apparatus 705 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs), a SoC, and/or other types of Semi-Custom ICs), which may be programmed in any manner known in the art. The functions of at least one component may also be implemented, in whole or in part, with instructions embodied in a memory, formatted to be executed by one or more general or application-specific processors.

In some examples, the receiver component 710 may include at least one RF receiver, such as at least one RF receiver operable to receive transmissions over a dedicated radio frequency spectrum band (e.g., a radio frequency spectrum band for which transmitting apparatuses may not contend for access because the radio frequency spectrum band is licensed to some users for some uses (e.g., a licensed radio frequency spectrum band usable for LTE/LTE-A communications)) or a shared radio frequency spectrum band (e.g., a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner)). In some examples, the dedicated radio frequency spectrum band or the shared radio frequency spectrum band may be used for LTE/LTE-A communications, as described, for example, with reference to FIG. 1 or 2. The receiver component 710 may in some cases include separate receivers for the dedicated radio frequency spectrum band and the shared radio frequency spectrum band. The separate receivers may, in some examples, take the form of an LTE/LTE-A receiver component for communicating over the dedicated radio frequency spectrum band (e.g., LTE/LTE-A receiver component for dedicated RF spectrum band 712), and an LTE/LTE-A receiver component for communicating over the shared radio frequency spectrum band (e.g., LTE/LTE-A receiver component for shared RF spectrum band 714). The receiver component 710, including the LTE/LTE-A receiver component for dedicated RF spectrum band 712 or the LTE/LTE-A receiver component for shared RF spectrum band 714, may be used to receive various types of data or control signals (i.e., transmissions) over one or more communication links of a wireless communication system, such as one or more communication links of the wireless communication system 100, 200, 400, or 450 described with reference to FIG. 1, 2, 4A, or 4B. The communication links may be established over the dedicated radio frequency spectrum band or the shared radio frequency spectrum band.

In some examples, the transmitter component 730 may include at least one RF transmitter, such as at least one RF transmitter operable to transmit over the dedicated radio frequency spectrum band or the shared radio frequency spectrum band. The transmitter component 730 may in some cases include separate transmitters for the dedicated radio frequency spectrum band and the shared radio frequency spectrum band. The separate transmitters may, in some examples, take the form of an LTE/LTE-A transmitter component for communicating over the dedicated radio frequency spectrum band (e.g., LTE/LTE-A transmitter component for dedicated RF spectrum band 732), and an LTE/LTE-A transmitter component for communicating over the shared radio frequency spectrum band (e.g., LTE/LTE-A transmitter component for shared RF spectrum band 734). The transmitter component 730, including the LTE/LTE-A transmitter component for dedicated RF spectrum band 732 or the LTE/LTE-A transmitter component for shared RF spectrum band 734, may be used to transmit various types of data or control signals (i.e., transmissions) over one or more communication links of a wireless communication system, such as one or more communication links of the wireless communication system 100, 200, 400, or 450 described with reference to FIG. 1, 2, 4A, or 4B. The communication links may be established over the dedicated radio frequency spectrum band or the shared radio frequency spectrum band.

In some examples, the wireless communication management component 720 may be used to manage one or more aspects of wireless communication for the apparatus 705. In some examples, the wireless communication management component 720 may include a partial subframe transmission component 735, a channel reservation signal transmission component 740, a downlink-uplink transmission configuration management component 745, a RACH resource allocation component 750, a base station-triggered uplink management component 755, or a serving cell co-location information transmission component 760.

The partial subframe transmission component 735 may be used to generate and transmit the semi-static partial subframe configuration, dynamic partial subframe configuration, grant, or data received by the semi-statically configured partial subframe processing component 540 described with reference to FIG. 5. The partial subframe transmission may also or alternatively be used to generate and transmit the first data or the second data received by the alternatively encoded partial subframe processing component 545 described with reference to FIG. 5. The partial subframe transmission may also or alternatively be used to generate and transmit the scaled control channel received by the scaled control channel processing component 550 described with reference to FIG. 5. The partial subframe transmission may also or alternatively be used to generate and transmit the same-carrier scheduling or cross-carrier scheduling received by the decoupled control channel processing component 555 described with reference to FIG. 5.

The channel reservation signal transmission component 740 may be used to generate and transmit the at least one channel reservation signal received by the channel reservation signal processing component 635 described with reference to FIG. 6.

The downlink-uplink transmission configuration management component 745 may be used to generate and transmit the first indication, second indication, or downlink transmission received by the downlink-uplink transmission configuration processing component 640 described with reference to FIG. 6.

The RACH resource allocation component 750 may be used to generate and transmit the indication of the RACH occasion and indication of the RACH resources received by the RACH management component 645 described with reference to FIG. 6.

The base station-triggered uplink management component 755 may be used to generate and transmit the channel reservation signal received by the base station-triggered uplink management component 650 described with reference to FIG. 6.

The serving cell co-location information transmission component 760 may be used to generate and transmit the indication of whether a first serving cell and a second serving cell are co-located, as received by the serving cell information management component 655 described with reference to FIG. 6.

Figure 8:
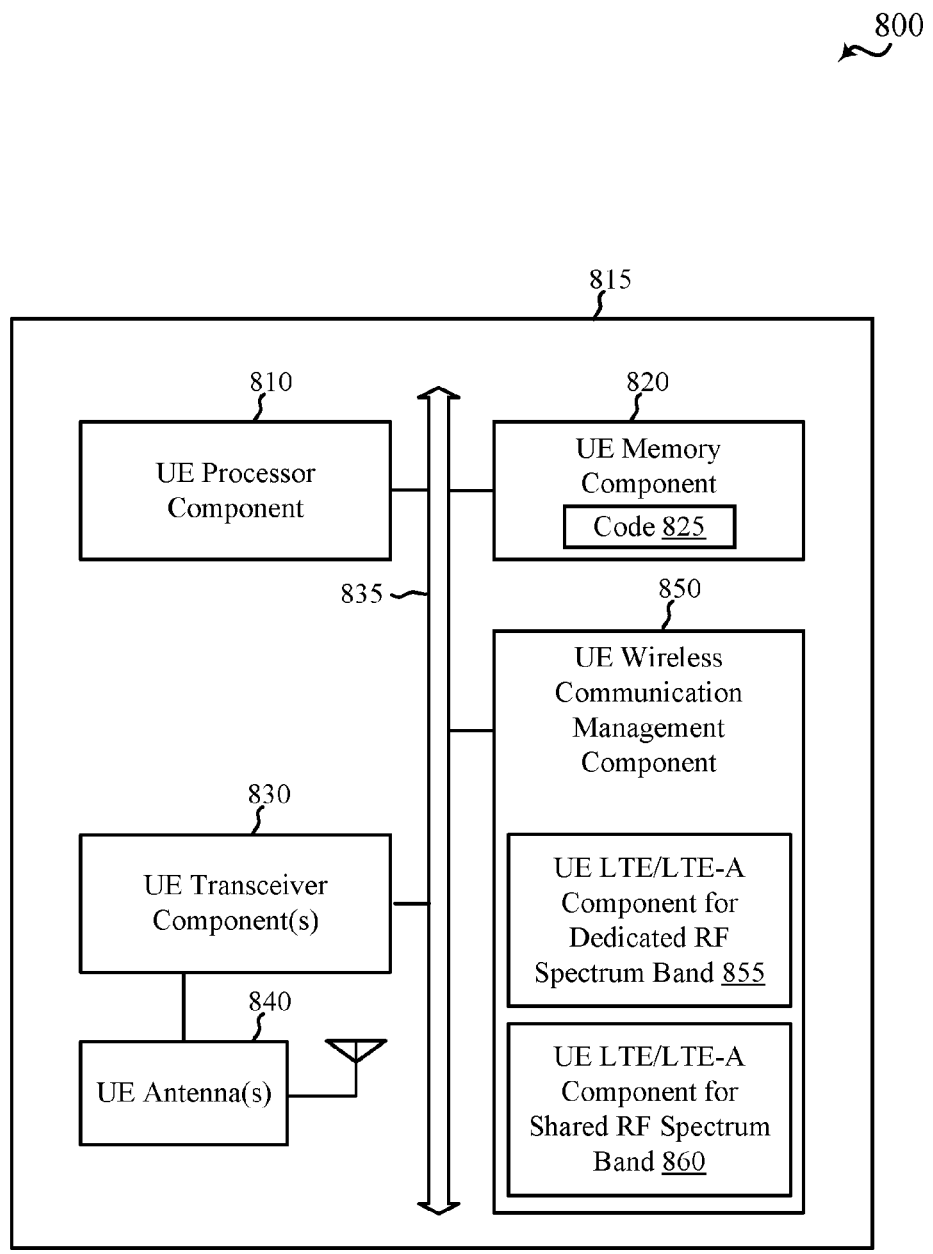
FIG. 8 shows a block diagram of a UE for use in wireless communication, in accordance with various aspects of the present disclosure.

FIG. 8 shows a block diagram 800 of a UE 815 for use in wireless communication, in accordance with various aspects of the present disclosure. The UE 815 may have various configurations and may be included or be part of a personal computer (e.g., a laptop computer, a netbook computer, a tablet computer, etc.), a cellular telephone, a PDA, a digital video recorder (DVR), an internet appliance, a gaming console, an e-reader, etc. The UE 815 may, in some examples, have an internal power supply (not shown), such as a small battery, to facilitate mobile operation. In some examples, the UE 815 may be an example of aspects of one or more of the UE 115, 215, 215-a, 215-b, 215-c, 415, or 415-a described with reference to FIG. 1, 2, or 4, or aspects of one or more of the apparatuses 515 or 615 described with reference to FIG. 5 or 6. The UE 815 may be configured to implement at least some of the UE or apparatus features and functions described with reference to FIG. 1, 2, 3, 4A, 4B, 5, or 6.

The UE 815 may include a UE processor component 810, a UE memory component 820, at least one UE transceiver component (represented by UE transceiver component(s) 830), at least one UE antenna (represented by UE antenna(s) 840), or a UE wireless communication management component 860. At least one of these components may be in communication with each other, directly or indirectly, over one or more buses 835.

The UE memory component 820 may include random access memory (RAM) or read-only memory (ROM). The UE memory component 820 may store computer-readable, computer-executable code 825 containing instructions that are configured to, when executed, cause the UE processor component 810 to perform various functions described herein related to wireless communication, including, for example, the processing of information pertaining to or data scheduled for a partial subframe, the processing of a channel reservation signal, the processing of a downlink-uplink transmission configuration, the management of a RACH procedure, the management of a base station-triggered uplink transmission, or the management of serving cell co-location information. Alternatively, the code 825 may not be directly executable by the UE processor component 810 but be configured to cause the UE 815 (e.g., when compiled and executed) to perform various of the functions described herein.

The UE processor component 810 may include an intelligent hardware device, e.g., a central processing unit (CPU), a microcontroller, an ASIC, etc. The UE processor component 810 may process information received through the UE transceiver component(s) 830 or information to be sent to the UE transceiver component(s) 830 for transmission through the UE antenna(s) 840. The UE processor component 810 may handle, alone or in connection with the UE wireless communication management component 860, various aspects of communicating over (or managing communications over) a dedicated radio frequency spectrum band (e.g., a radio frequency spectrum band for which transmitting apparatuses may not contend for access because the radio frequency spectrum band is licensed to some users for some uses (e.g., a licensed radio frequency spectrum band usable for LTE/LTE-A communications)) or a shared radio frequency spectrum band (e.g., a radio frequency spectrum band for which transmitting apparatuses may need to contend for access (e.g., a radio frequency spectrum band that is available for unlicensed use, such as Wi-Fi use, or a radio frequency spectrum band that is available for use by multiple operators in an equally shared or prioritized manner)).

The UE transceiver component(s) 830 may include a modem configured to modulate packets and provide the modulated packets to the UE antenna(s) 840 for transmission, and to demodulate packets received from the UE antenna(s) 840. The UE transceiver component(s) 830 may, in some examples, be implemented as one or more UE transmitter components and one or more separate UE receiver components. The UE transceiver component(s) 830 may support communications in the licensed radio frequency spectrum band or the unlicensed radio frequency spectrum band. The UE transceiver component(s) 830 may be configured to communicate bi-directionally, via the UE antenna(s) 840, with one or more of the base stations 105, 205, 205-a, 405, 405-a, or 405-b described with reference to FIG. 1, 2, 4A, or 4B. While the UE 815 may include a single UE antenna, there may be examples in which the UE 815 may include multiple UE antennas 840.

The UE wireless communication management component 860 may be configured to perform or control some or all of the UE or apparatus features or functions described with reference to FIG. 1, 2, 3, 4A, 4B, 5, or 6 related to wireless communication over the dedicated radio frequency spectrum band or the shared radio frequency spectrum band. For example, the UE wireless communication management component 860 may be configured to support a supplemental downlink mode (e.g., a licensed assisted access mode), a carrier aggregation mode, or a standalone mode using the dedicated radio frequency spectrum band or the shared radio frequency spectrum band. The UE wireless communication management component 860 may include a UE LTE/LTE-A component for dedicated RF spectrum band 865 configured to handle LTE/LTE-A communications in the dedicated radio frequency spectrum band, or a UE LTE/LTE-A component for shared RF spectrum band 870 configured to handle LTE/LTE-A communications in the shared radio frequency spectrum band. The UE wireless communication management component 860, or portions of it, may include a processor, or some or all of the functions of the UE wireless communication management component 860 may be performed by the UE processor component 810 or in connection with the UE processor component 810. In some examples, the UE wireless communication management component 860 may be an example of the wireless communication management component 520 or 620 described with reference to FIG. 5 or 6.

Figure 9:
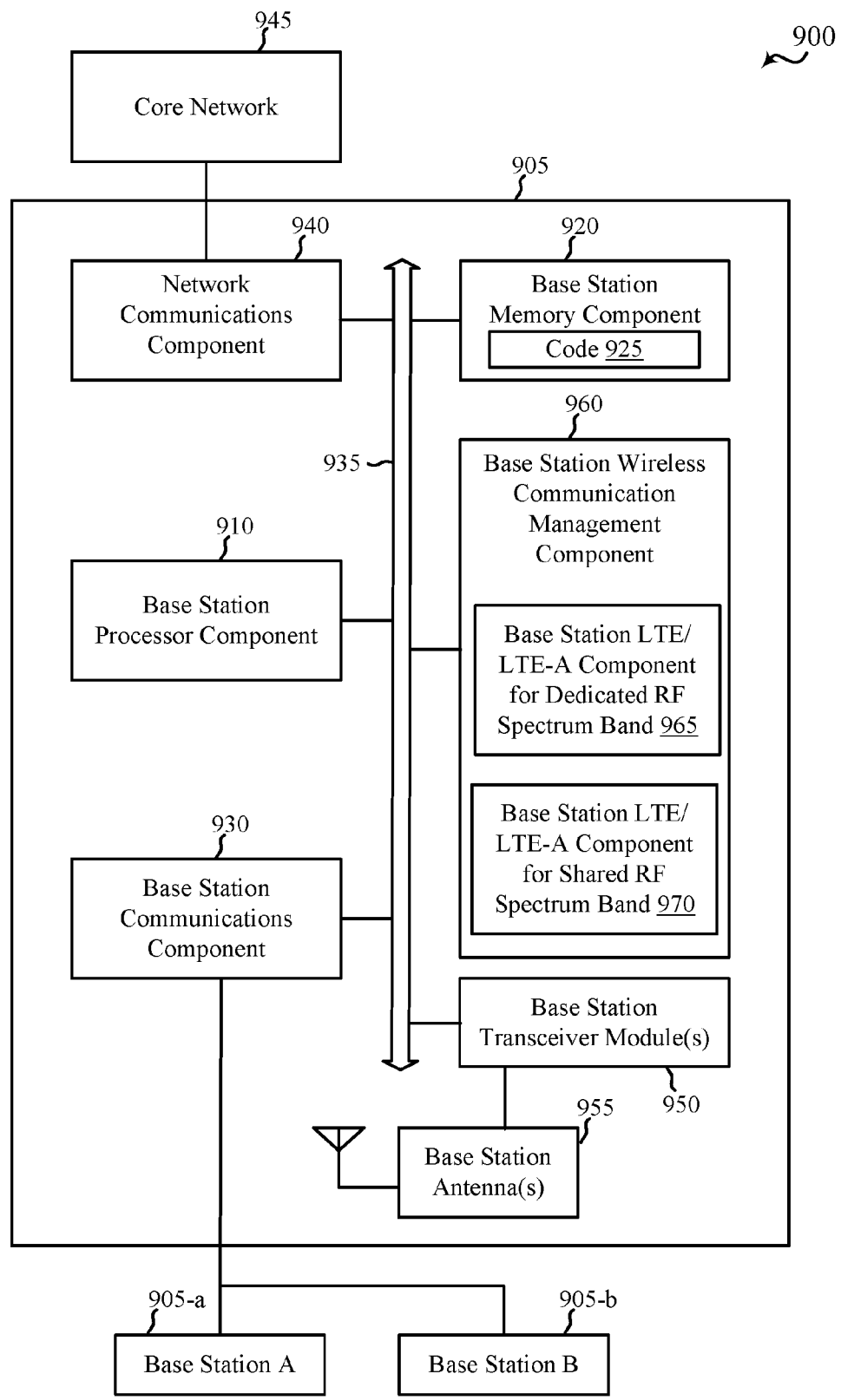
FIG. 9 shows a block diagram of a base station (e.g., a base station forming part or all of an eNB) for use in wireless communication, in accordance with various aspects of the present disclosure.

FIG. 9 shows a block diagram 900 of a base station 905 (e.g., a base station forming part or all of an eNB) for use in wireless communication, in accordance with various aspects of the present disclosure. In some examples, the base station 905 may be an example of one or more aspects of the base station 105, 205, 205-a, 405, 405-a, or 405-b described with reference to FIG. 1, 2, 4A, or 4B, or aspects of the apparatus 705 described with reference to FIG. 7. The base station 905 may be configured to implement or facilitate at least some of the base station features and functions described with reference to FIG. 1, 2, 3, 4A, 4B, or 7.

The base station 905 may include a base station processor component 910, a base station memory component 920, at least one base station transceiver component (represented by base station transceiver component(s) 950), at least one base station antenna (represented by base station antenna(s) 955), or a base station wireless communication management component 960. The base station 905 may also include one or more of a base station communications component 930 or a network communications component 940. At least one of these components may be in communication with each other, directly or indirectly, over one or more buses 935.

The base station memory component 920 may include RAM or ROM. The base station memory component 920 may store computer-readable, computer-executable code 925 containing instructions that are configured to, when executed, cause the base station processor component 910 to perform various functions described herein related to wireless communication, including, for example, the transmission of information pertaining to or data scheduled for a partial subframe, the transmission of a channel reservation signal, the transmission of a downlink-uplink transmission configuration, the allocation of RACH resources, the management of a base station-triggered uplink transmission, or the transmission of serving cell co-location information. Alternatively, the code 925 may not be directly executable by the base station processor component 910 but be configured to cause the base station 905 (e.g., when compiled and executed) to perform various of the functions described herein.

The base station processor component 910 may include an intelligent hardware device, e.g., a CPU, a microcontroller, an ASIC, etc. The base station processor component 910 may process information received through the base station transceiver component(s) 950, the base station communications component 930, or the network communications component 940. The base station processor component 910 may also process information to be sent to the transceiver component(s) 950 for transmission through the antenna(s) 955, to the base station communications component 930, for transmission to one or more other base stations 905-a and 905-b, or to the network communications component 940 for transmission to a core network 945, which may be an example of one or more aspects of the core network 130 described with reference to FIG. 1. The base station processor component 910 may handle, alone or in connection with the base station wireless communication management component 960, various aspects of communicating over (or managing communications over) a dedicated radio frequency spectrum band or a shared radio frequency spectrum band. The dedicated radio frequency spectrum band may include a radio frequency spectrum band for which transmitting apparatuses may not contend for access (e.g., a radio frequency spectrum band licensed to some users for some uses, such as a licensed radio frequency spectrum band usable for LTE/LTE-A communications). The shared radio frequency spectrum band may include a radio frequency spectrum band for which transmitting apparatuses may contend for access (e.g., a radio frequency spectrum band that is available for unlicensed use, such as Wi-Fi use, or a radio frequency spectrum band that is available for use by multiple operators in an equally shared or prioritized manner).

The base station transceiver component(s) 950 may include a modem configured to modulate packets and provide the modulated packets to the base station antenna(s) 955 for transmission, and to demodulate packets received from the base station antenna(s) 955. The base station transceiver component(s) 950 may, in some examples, be implemented as one or more base station transmitter components and one or more separate base station receiver components. The base station transceiver component(s) 950 may support communications in the dedicated radio frequency spectrum band or the shared radio frequency spectrum band. The base station transceiver component(s) 950 may be configured to communicate bi-directionally, via the antenna(s) 955, with one or more UEs or apparatuses, such as one or more of the UEs 115, 215, 215-a, 215-b, 215-c, 415, 415-a, or 815 described with reference to FIG. 1, 2, 4A, 4B, or 8, or one or more of the apparatuses 515 or 615 described with reference to FIG. 5 or 6. The base station 905 may, for example, include multiple base station antennas 955 (e.g., an antenna array). The base station 905 may communicate with the core network 945 through the network communications component 940. The base station 905 may also communicate with other base stations, such as the base stations 905-a and 905-b, using the base station communications component 930.

The base station wireless communication management component 960 may be configured to perform or control some or all of the features or functions described with reference to FIG. 1, 2, 3, 4A, 4B, or 7 related to wireless communication over the dedicated radio frequency spectrum band or the shared radio frequency spectrum band. For example, the base station wireless communication management component 960 may be configured to support a supplemental downlink mode (e.g., a licensed assisted access mode), a carrier aggregation mode, or a standalone mode using the dedicated radio frequency spectrum band or the shared radio frequency spectrum band. The base station wireless communication management component 960 may include a base station LTE/LTE-A component for dedicated RF spectrum band 965 configured to handle LTE/LTE-A communications in the dedicated radio frequency spectrum band, and a base station LTE/LTE-A component for shared RF spectrum band 970 configured to handle LTE/LTE-A communications in the shared radio frequency spectrum band. The base station wireless communication management component 960, or portions of it, may include a processor, or some or all of the functions of the base station wireless communication management component 960 may be performed by the base station processor component 910 or in connection with the base station processor component 910. In some examples, the base station wireless communication management component 960 may be an example of the wireless communication management component 720 described with reference to FIG. 7.

Figure 10:
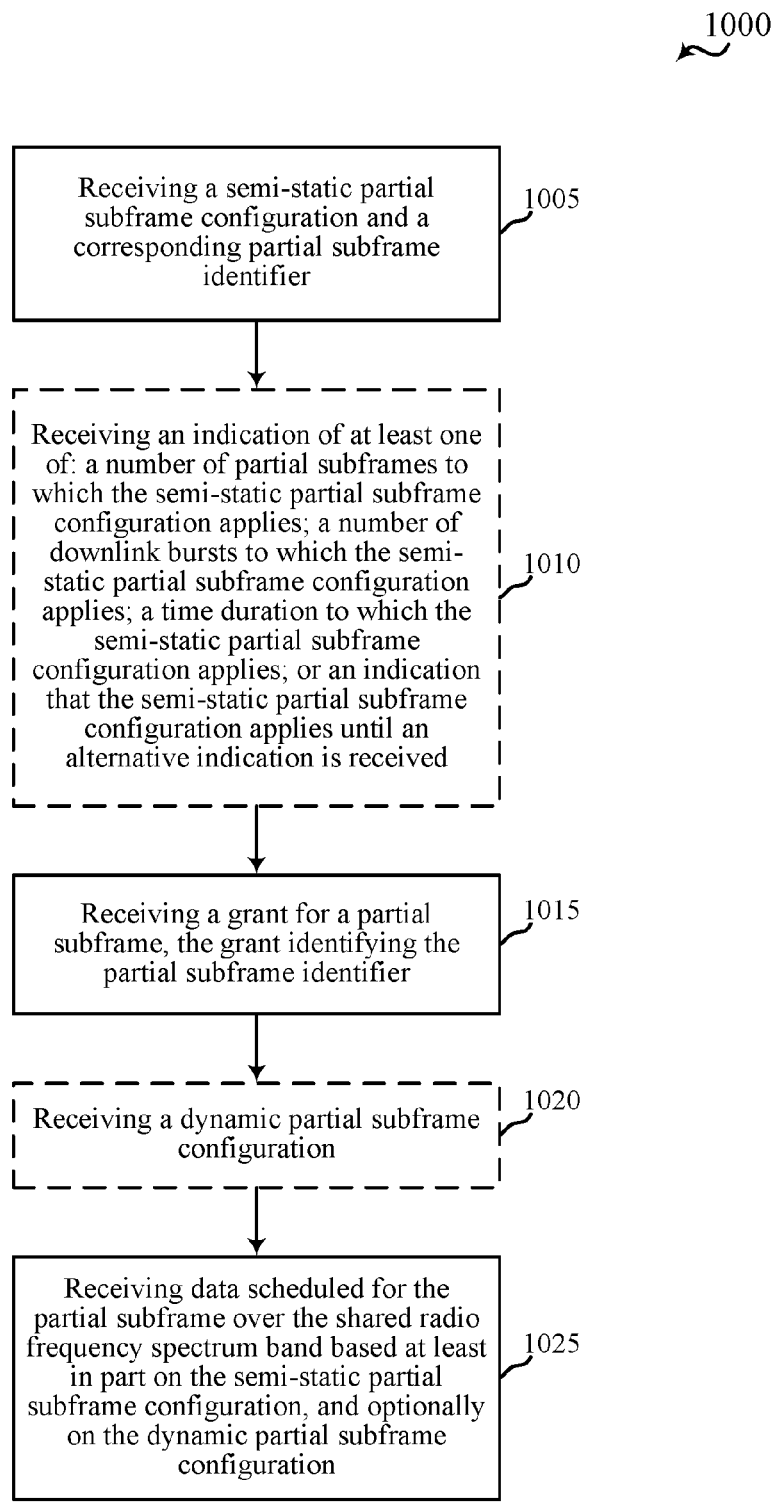
FIG. 10 is a flow chart illustrating an exemplary method for wireless communication, in accordance with various aspects of the present disclosure.

FIG. 10 is a flow chart illustrating an exemplary method 1000 for wireless communication, in accordance with various aspects of the present disclosure. For clarity, the method 1000 is described below with reference to aspects of one or more of the UEs 115, 215, 215-*a*, 215-*b*, 215-*c*, 415, 415-*a*, or 815 described with reference to FIG. 1, 2, 4A, 4B, or 8, or aspects of the apparatus 515 described with reference to FIG. 5. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 1005, the method 1000 may include receiving a semi-static partial subframe configuration and a corresponding partial subframe identifier (e.g., a partial subframe RNTI). In some examples, the semi-static partial subframe configuration may be received in a RRC message (e.g., from a base station). In some examples, the semi-static partial subframe configuration may include at least a RB allocation type, or a RB allocation, or a transmission rank, or a MCS, or a TBS table, or a combination thereof. In some examples, the semi-static partial subframe configuration may include at least one of a TDM configuration or a FDM configuration. In some examples, the semi-static partial subframe configuration may be for a partial subframe occurring at a beginning of a subframe or at an end of a subframe. In some examples, the semi-static partial subframe configuration may be transmitted to one or a small number of UEs (e.g., because of the limited number of resources that may be available for allocation in a partial subframe).

In some examples, the semi-static partial subframe configuration may indicate a type of partial subframe to which the semi-static partial subframe configuration applies. In some examples, the type of partial subframe may be based at least in part on a length of partial subframe. For example, the semi-static partial subframe configuration may indicate that it applies to partial subframes having a duration of seven symbol periods (e.g., seven OFDM symbol periods). Other semi-static partial subframe configurations may be received for other types of partial subframes (e.g., partial subframes having durations of four symbol periods or ten symbol periods). Partial subframes of shorter duration may be associated with lower transmission rank configurations (e.g., rank 1 or 2) due to limitations on the DMRS available for demodulation).

At block 1010, the method 1000 may optionally include receiving an indication of at least one of: a number of partial subframes to which the semi-static partial subframe configuration applies; a number of downlink bursts to which the semi-static partial subframe configuration applies; a time duration to which the semi-static partial subframe configuration applies; or an indication that the semi-static partial subframe configuration applies until an alternative indication is received. In some examples, the indication received at block 1010 may be received with the semi-static partial subframe configuration.

At block 1015, the method 1000 may include receiving a grant for a partial subframe. The grant may identify the partial subframe identifier. In some examples, the grant may be received over a dedicated radio frequency spectrum band. In some examples, the grant may be received over a PCC (e.g., in the dedicated radio frequency spectrum band or in a shared radio frequency spectrum band). The dedicated radio frequency spectrum band may include a radio frequency spectrum band for which transmitting apparatuses may not contend for access because the radio frequency spectrum band is licensed to some users for some uses (e.g., a licensed radio frequency spectrum band usable for LTE/LTE-A communications). The shared radio frequency spectrum band may include a radio frequency spectrum band for which transmitting apparatuses may contend for access (e.g., a radio frequency spectrum band that is available for unlicensed use, such as Wi-Fi use, or a radio frequency spectrum band that is available for use by multiple operators in an equally shared or prioritized manner). In some examples, the grant may include a HARQ ID, or a retransmission index, or a NDI, or a combination thereof. At least in part because of the semi-static partial subframe configuration, the grant received at block 1015 may use fewer resources than a grant received for a full subframe.

At block 1020, the method 1000 may optionally include receiving a dynamic partial subframe configuration. In some examples, the dynamic partial subframe configuration may be received with the grant.

At block 1025, the method 1000 may include receiving data scheduled for the partial subframe over the shared radio frequency spectrum band based at least in part on the semi-static partial subframe configuration. When a dynamic partial subframe configuration is received at block 1020, the data scheduled for the partial subframe may also be received based at least in part on the dynamic partial subframe configuration.

In some examples, the method 1000 may include receiving data scheduled for a plurality of partial subframes over the shared radio frequency spectrum band based at least in part on the semi-static partial subframe configuration. For example, data may be received for the number of partial subframes, the number of downlink bursts, or the time duration specified at block 1010, or until an alternative indication (e.g., a different semi-static partial subframe configuration) is received. In some examples of the method 1000, a single grant received at block 1015 may apply to the plurality of partial subframes or a subset thereof.

In some examples, the data received at block 1025 may correspond to an initial data transmission, and when the data cannot be decoded, or when receipt of the data is NAK'd, the method 1000 may include receiving a retransmission of the data initially transmitted in the partial subframe in at least one full subframe (e.g., in some examples, data that is initially scheduled for transmission in a partial subframe may not be scheduled for retransmission in a partial subframe).

The operation(s) at block 1005, 1010, 1015, 1020, or 1025 may be performed using the wireless communication management component 520 or 860 described with reference to FIG. 5 or 8, or the partial subframe processing component 535 or semi-statically configured partial subframe processing component 540 described with reference to FIG. 5.

Thus, the method 1000 may provide for wireless communication. It should be noted that the method 1000 is just one implementation and that the operations of the method 1000 may be rearranged or otherwise modified such that other implementations are possible.

Figure 11:
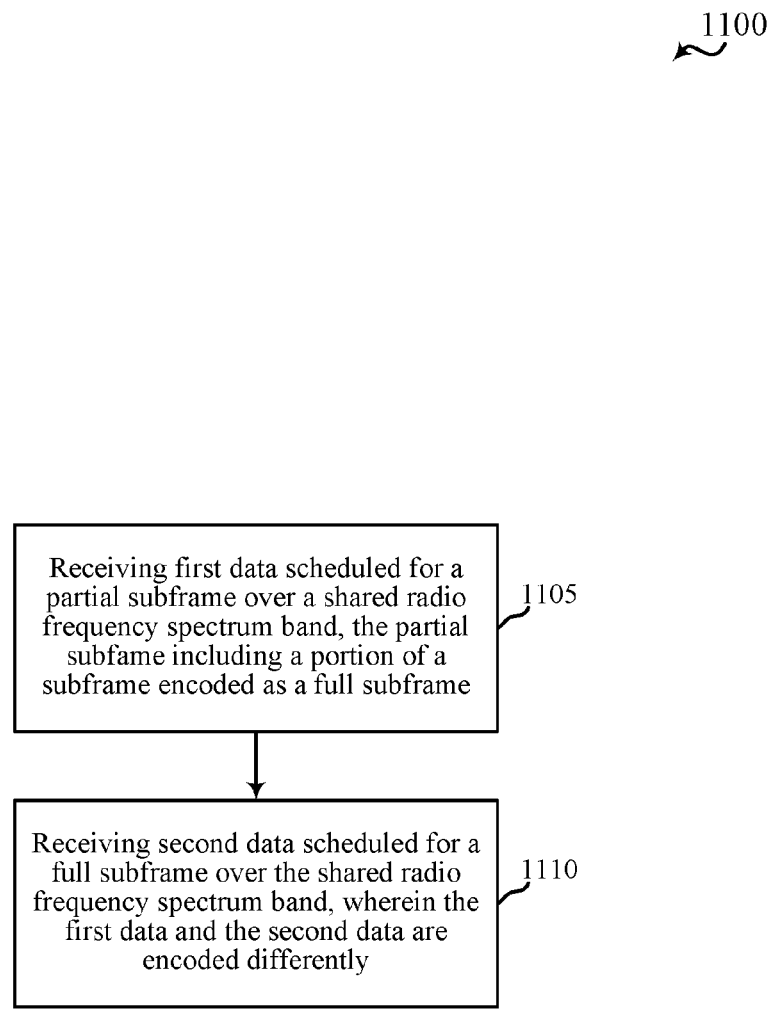
FIG. 11 is a flow chart illustrating an exemplary method for wireless communication, in accordance with various aspects of the present disclosure.

FIG. 11 is a flow chart illustrating an exemplary method 1100 for wireless communication, in accordance with various aspects of the present disclosure. For clarity, the method 1100 is described below with reference to aspects of one or more of the UEs 115, 215, 215-a, 215-b, 215-c, 415, 415-a, or 815 described with reference to FIG. 1, 2, 4A, 4B, or 8, or aspects of the apparatus 515 described with reference to FIG. 5. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 1105, the method 1100 may include receiving first data scheduled for a partial subframe over a shared radio frequency spectrum band. The partial subframe may include a portion of a subframe encoded as a full subframe. The shared radio frequency spectrum band may include a radio frequency spectrum band for which transmitting apparatuses may contend for access (e.g., a radio frequency spectrum band that is available for unlicensed use, such as Wi-Fi use, or a radio frequency spectrum band that is available for use by multiple operators in an equally shared or prioritized manner).

At block 1110, the method 1100 may include receiving second data scheduled for a full subframe over the shared radio frequency spectrum band, where the first data and the second data are encoded differently.

In some examples of the method 1100, the first data may be encoded using at least one of a first MCS or a first TBS that is lower than a second MCS or a second TBS supported by a channel quality of a channel over which the first data is received (e.g., the first MCS or the first TBS may be selected more conservatively than the second MCS or the second TBS). The first MCS and/or first TBS may increase a UE's likelihood of being able to decode the first data, thereby decreasing the likelihood that the first data may need to be retransmitted. In some examples, the first data may include a portion of data encoded for a full subframe. When the data for the full subframe includes redundancies, a UE may be able to receive and properly decode the first data despite receiving just a portion of the data.

The operation(s) at block 1105 or 1110 may be performed using the wireless communication management component 520 or 860 described with reference to FIG. 5 or 8, or the partial subframe processing component 535 or alternatively encoded partial subframe processing component 545 described with reference to FIG. 5.

Thus, the method 1100 may provide for wireless communication. It should be noted that the method 1100 is just one implementation and that the operations of the method 1100 may be rearranged or otherwise modified such that other implementations are possible.

FIG. 12 is a flow chart illustrating an exemplary method 1200 for wireless communication, in accordance with various aspects of the present disclosure. For clarity, the method 1200 is described below with reference to aspects of one or more of the UEs 115, 215, 215-a, 215-b, 215-c, 415, 415-a, or 815 described with reference to FIG. 1, 2, 4A, 4B, or 8, or aspects of the apparatus 515 described with reference to FIG. 5. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 1205, the method 1200 may include receiving a control channel of a partial subframe over a shared radio frequency spectrum band. A first amount of resources allocated to the control channel may be based at least in part on a second amount of resources allocated to the partial subframe. The shared radio frequency spectrum band may include a radio frequency spectrum band for which transmitting apparatuses may contend for access (e.g., a radio frequency spectrum band that is available for unlicensed use, such as Wi-Fi use, or a radio frequency spectrum band that is available for use by multiple operators in an equally shared or prioritized manner). In some examples, the control channel may include an EPDCCH. In some examples, the first amount of resources may include an amount of frequency resources, such as an amount of resource blocks. In some examples, the amount of frequency resources may be scaled higher when the second amount of resources allocated to the partial subframe includes a lower amount of time resources, and the amount of frequency resources may be scaled lower when the second amount of resources allocated to the partial subframe includes a higher amount of time resources.

In some examples of the method 1200, the first amount of resources may include five resource blocks when the partial subframe has a duration of ten symbol periods (e.g., when the second amount of resources includes ten symbol periods); the first amount of resources may include six or eight resource blocks when the partial subframe has a duration of seven symbol periods (e.g., a duration of a half subframe or one slot); and the first amount of resources may include ten resource blocks when the partial subframe has a duration of four symbol periods. The first amount of resources may include four resource blocks when the second amount of resources includes fourteen symbol periods (e.g., a full subframe). In some examples, the symbol periods may be OFDM symbol periods.

The operation(s) at block 1205 may be performed using the wireless communication management component 520 or 860 described with reference to FIG. 5 or 8, or the partial subframe processing component 535 or scaled control channel processing component 550 described with reference to FIG. 5.

Thus, the method 1200 may provide for wireless communication. It should be noted that the method 1200 is just one implementation and that the operations of the method 1200 may be rearranged or otherwise modified such that other implementations are possible.

Figure 13:
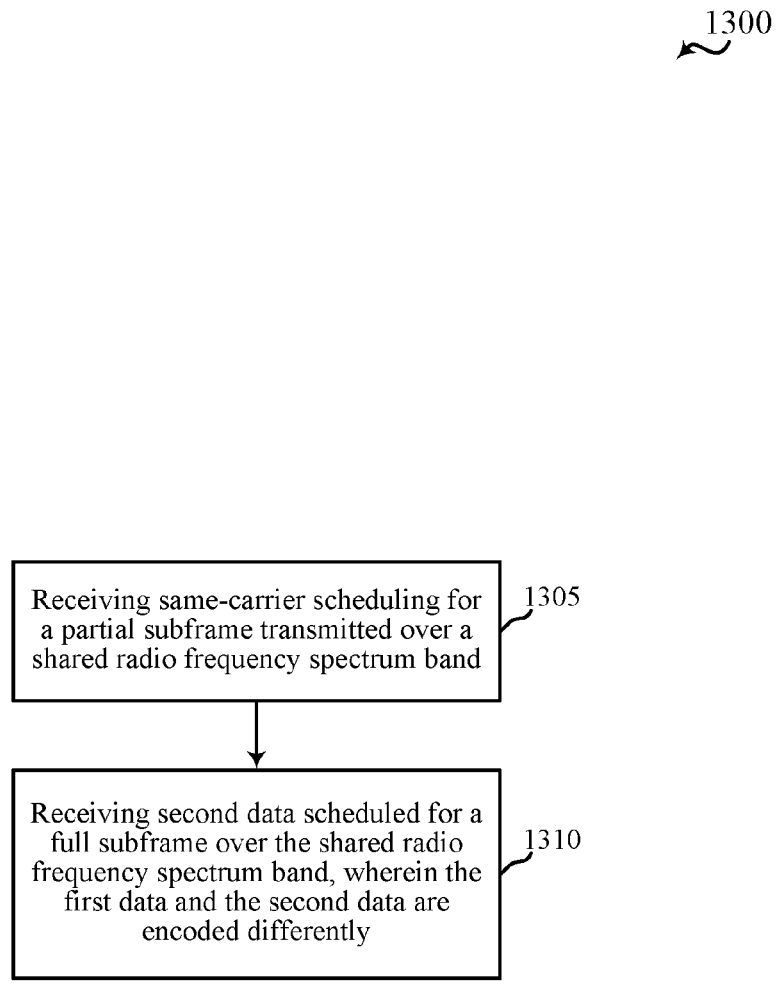
FIG. 13 is a flow chart illustrating an exemplary method for wireless communication, in accordance with various aspects of the present disclosure.

FIG. 13 is a flow chart illustrating an exemplary method 1300 for wireless communication, in accordance with various aspects of the present disclosure. For clarity, the method 1300 is described below with reference to aspects of one or more of the UEs 115, 215, 215-a, 215-b, 215-c, 415, 415-a, or 815 described with reference to FIG. 1, 2, 4A, 4B, or 8, or aspects of the apparatus 515 described with reference to FIG. 5. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 1305, the method 1300 may include receiving same-carrier scheduling for a partial subframe transmitted over a shared radio frequency spectrum band (e.g., the partial subframe may be self-scheduled). The shared radio frequency spectrum band may include a radio frequency spectrum band for which transmitting apparatuses may contend for access (e.g., a radio frequency spectrum band that is available for unlicensed use, such as Wi-Fi use, or a radio frequency spectrum band that is available for use by multiple operators in an equally shared or prioritized manner). In some examples, the same-carrier scheduling may be received on an EPDCCH.

At block 1310, the method 1300 may include receiving one of the same-carrier scheduling or cross-carrier scheduling for a full subframe received over the shared radio frequency spectrum band. In some examples, the same-carrier scheduling for a full subframe may be received on an EPDCCH. In some examples, the cross-carrier scheduling may be received on a PCC in a dedicated radio frequency spectrum band. In these examples, the cross-carrier scheduling may be received on a PDCCH. In other examples, the cross-carrier scheduling may be received on a SCC in the shared radio frequency spectrum band or the dedicated radio frequency spectrum band. In these examples, the cross-carrier scheduling may be received on an EPDCCH (in the shared radio frequency spectrum band) or a PDCCH (in the dedicated radio frequency spectrum band). The dedicated radio frequency spectrum band may include a radio frequency spectrum band for which transmitting apparatuses may not contend for access because the radio frequency spectrum band is licensed to some users for some uses (e.g., a licensed radio frequency spectrum band usable for LTE/LTE-A communications).

The operation(s) at block 1305 or 1310 may be performed using the wireless communication management component 520 or 860 described with reference to FIG. 5 or 8, or the partial subframe processing component 535 or decoupled control channel processing component 555 described with reference to FIG. 5.

Thus, the method 1300 may provide for wireless communication. It should be noted that the method 1300 is just one implementation and that the operations of the method 1300 may be rearranged or otherwise modified such that other implementations are possible.

Figure 14:
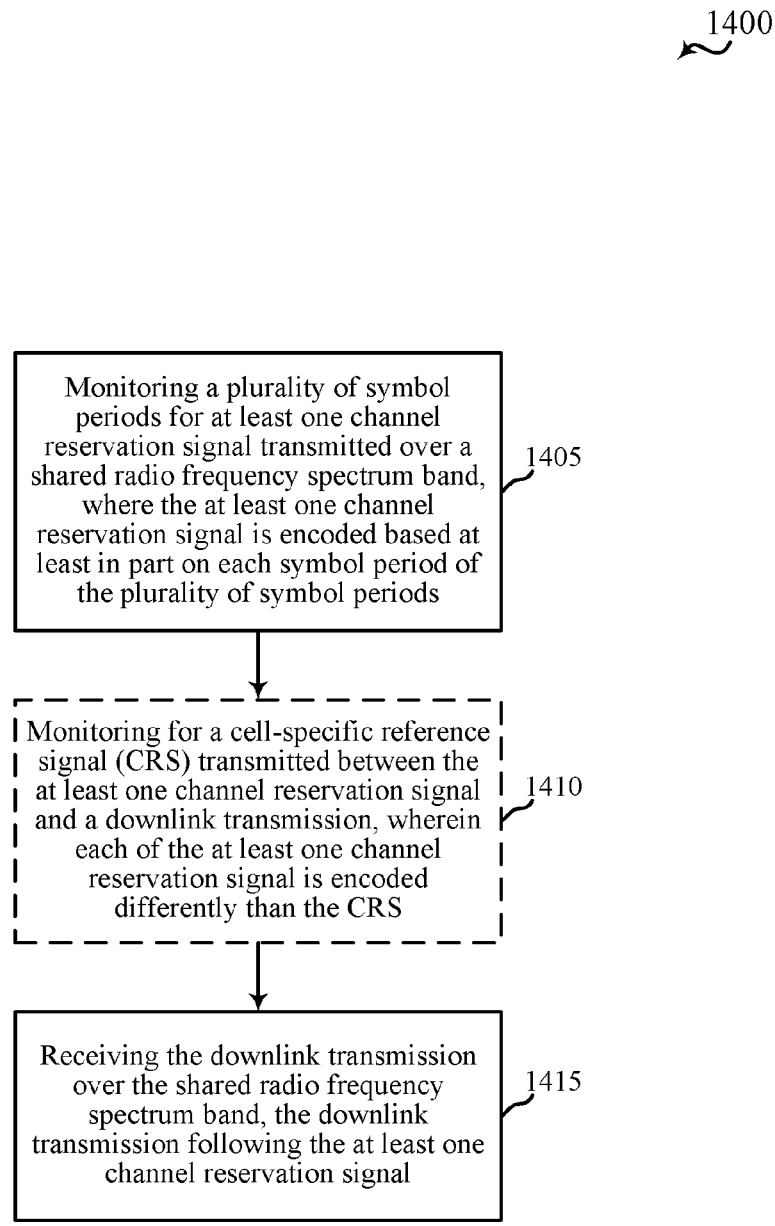
FIG. 14 is a flow chart illustrating an exemplary method for wireless communication, in accordance with various aspects of the present disclosure.

FIG. 14 is a flow chart illustrating an exemplary method 1400 for wireless communication, in accordance with various aspects of the present disclosure. For clarity, the method 1400 is described below with reference to aspects of one or more of the UEs 115, 215, 215-a, 215-b, 215-c, 415, 415-a, or 815 described with reference to FIG. 1, 2, 4A, 4B, or 8, or aspects of the apparatus 615 described with reference to FIG. 6. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 1405, the method 1400 may include monitoring a plurality of symbol periods (e.g., OFDM symbol periods of a subframe) for at least one channel reservation signal transmitted over a shared radio frequency spectrum band. The at least one channel reservation signal may be encoded based at least in part on at least one symbol period of the plurality of symbol periods. The shared radio frequency spectrum band may include a radio frequency spectrum band for which transmitting apparatuses may contend for access (e.g., a radio frequency spectrum band that is available for unlicensed use, such as Wi-Fi use, or a radio frequency spectrum band that is available for use by multiple operators in an equally shared or prioritized manner). In some examples, the at least one channel reservation signal may include at least one D-CUBS.

In some examples, the at least one channel reservation signal transmitted over the shared radio frequency spectrum band may include a channel reservation signal encoded based on a number of symbol periods for which the channel reservation signal is transmitted. Thus, a first encoding of a first channel reservation signal transmitted for two symbol periods may differ from a second encoding of a second channel reservation signal transmitted for one symbol period. A channel reservation signal may be transmitted for one of a plurality of different durations based, for example, on the symbol period in which a base station wins contention for access to the shared radio frequency spectrum band and begins transmitting the channel reservation signal.

In some examples, the at least one channel reservation signal transmitted over the shared radio frequency spectrum band may include a plurality of channel reservation signals transmitted in different contiguous symbol periods of the plurality of symbol periods. In these examples, an encoding of a first channel reservation signal received in a first symbol period of the plurality of symbol periods may differ from an encoding of a second channel reservation signal received in a second symbol period of the plurality of symbol periods. In some examples, the encoding of each channel reservation signal may differ. In other examples, the channel reservation signals transmitted in different symbol periods may be scrambled with different seeds.

At block 1410, the method 1400 may optionally include monitoring for a CRS transmitted between the at least one channel reservation signal and a subsequent downlink transmission. At least one of the at least one channel reservation signal may be encoded differently than the CRS. In some examples, the different encoding(s) may include a different sequence scrambling (or sequence scramblings).

At block 1415, the method 1400 may include receiving a downlink transmission over the shared radio frequency spectrum band. The downlink transmission may follow the at least one channel reservation signal. In some examples, the downlink transmission may include data scheduled for a partial subframe.

The operation(s) at block 1405, 1410, or 1415 may be performed using the wireless communication management component 620 or 860 described with reference to FIG. 6 or 8, or the channel reservation signal processing component 635 described with reference to FIG. 6.

Thus, the method 1400 may provide for wireless communication. It should be noted that the method 1400 is just one implementation and that the operations of the method 1400 may be rearranged or otherwise modified such that other implementations are possible.

Figure 15:
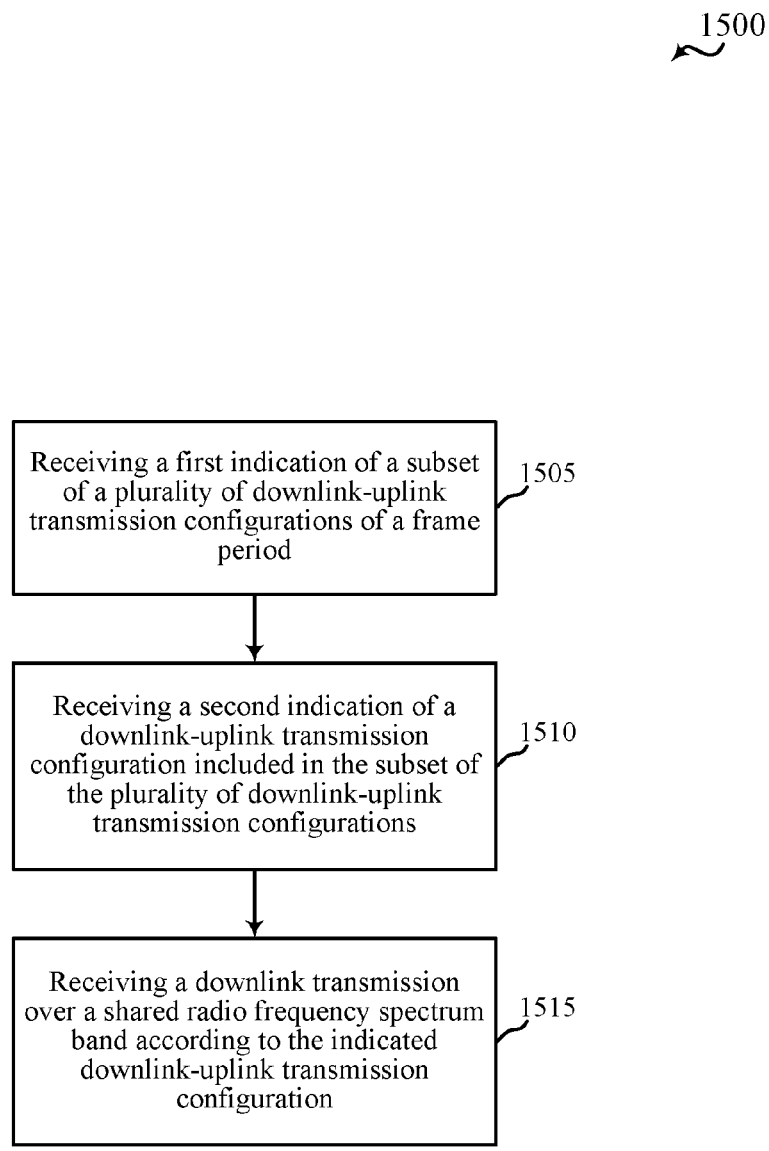
FIG. 15 is a flow chart illustrating an exemplary method for wireless communication, in accordance with various aspects of the present disclosure.

FIG. 15 is a flow chart illustrating an exemplary method 1500 for wireless communication, in accordance with various aspects of the present disclosure. For clarity, the method 1500 is described below with reference to aspects of one or more of the UEs 115, 215, 215-*a*, 215-*b*, 215-*c*, 415, 415-*a*, or 615 described with reference to FIG. 1, 2, 4A, 4B, or 8, or aspects of the apparatus 615 described with reference to FIG. 6. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 1505, the method 1500 may include receiving a first indication of a subset of a plurality of downlink-uplink transmission configurations of a frame period (i.e., a subset of less than all of the possible downlink-uplink transmission configurations of the frame period). In some examples, the subset of the plurality of downlink-uplink transmission configurations may include at least one partial subframe configuration. In some examples, the first indication of the subset of downlink-uplink transmission configurations may be received in a RRC message.

At block 1510, the method 1500 may include receiving a second indication of a downlink-uplink transmission configuration included in the subset of the plurality of downlink-uplink transmission configurations. In some examples, the second indication may be similar to an eIMTA configuration. In some examples, the second indication may indicate (and thus, the subset of the plurality of downlink-uplink transmission configurations may include) a downlink-uplink configuration including at least one of: a plurality of downlink bursts, or a plurality of uplink bursts, or a plurality of downlink bursts and at least one uplink burst, or a plurality of uplink bursts and at least one downlink burst, or a combination thereof. In some examples, the second indication may indicate a downlink-uplink configuration including a sequence of alternating downlink bursts and uplink bursts. In some examples, the second indication may be received on a PFFICH.

At block 1515, the method 1500 may include receiving a downlink transmission over a shared radio frequency spectrum band according to the indicated downlink-uplink transmission configuration. The shared radio frequency spectrum band may include a radio frequency spectrum band for which transmitting apparatuses may contend for access (e.g., a radio frequency spectrum band that is available for unlicensed use, such as Wi-Fi use, or a radio frequency spectrum band that is available for use by multiple operators in an equally shared or prioritized manner).

In some examples of the method 1500, at least one of the downlink bursts or uplink bursts of the downlink transmission received at block 1515 may be separated from other downlink bursts or other uplink bursts by a transmission gap. In some examples, the transmission gap may include a number of CCA occasions (e.g., one or more CCA occasions).

In some examples, the method 1500 may include determining the shared radio frequency spectrum band is available prior to receiving the downlink transmission, and refraining from determining the shared radio frequency spectrum band is available again until after the downlink transmission. In some examples, determining the shared radio frequency spectrum band is available may include receiving at least one channel reservation signal (e.g., at least one D-CUBS) from a base station and/or performing a CCA procedure at a UE or apparatus performing the method 1500.

The operation(s) at block 1505, 1510, or 1515 may be performed using the wireless communication management component 620 or 860 described with reference to FIG. 6 or 8, or the downlink-uplink transmission configuration processing component 640 described with reference to FIG. 6.

Thus, the method 1500 may provide for wireless communication. It should be noted that the method 1500 is just one implementation and that the operations of the method 1500 may be rearranged or otherwise modified such that other implementations are possible.

Figure 16:
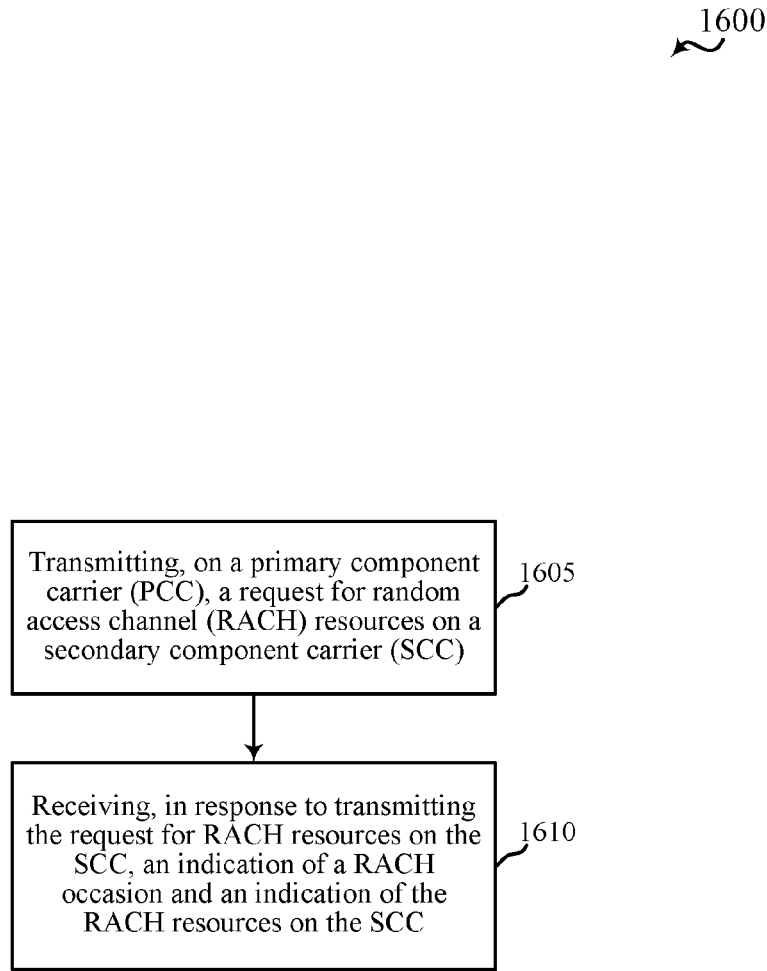
FIG. 16 is a flow chart illustrating an exemplary method for wireless communication, in accordance with various aspects of the present disclosure.

FIG. 16 is a flow chart illustrating an exemplary method 1600 for wireless communication, in accordance with various aspects of the present disclosure. For clarity, the method 1600 is described below with reference to aspects of one or more of the UEs 115, 215, 215-*a*, 215-*b*, 215-*c*, 415, 415-*a*, or 615 described with reference to FIG. 1, 2, 4A, 4B, or 8, or aspects of the apparatus 615 described with reference to FIG. 6. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 1605, the method 1600 may include transmitting, on a PCC, a request for RACH resources on a SCC. In some examples, the request for RACH resources on the SCC may be transmitted at least one of: in a PHY signal, in a SR, in a MAC control element, or multiplexed with UCI.

At block 1610, the method 1600 may include receiving, in response to transmitting the request for RACH resources on the SCC, an indication of a RACH occasion and an indication of the RACH resources on the SCC.

In some examples of the method 1600, the PCC may be in one of a dedicated radio frequency spectrum band or a shared radio frequency spectrum band, and the SCC may be in the shared radio frequency spectrum band. The shared radio frequency spectrum band may include a radio frequency spectrum band for which transmitting apparatuses may contend for access (e.g., a radio frequency spectrum band that is available for unlicensed use, such as Wi-Fi use, or a radio frequency spectrum band that is available for use by multiple operators in an equally shared or prioritized manner). The dedicated radio frequency spectrum band may include a radio frequency spectrum band for which transmitting apparatuses may not contend for access because the radio frequency spectrum band is licensed to some users for some uses (e.g., a licensed radio frequency spectrum band usable for LTE/LTE-A communications).

The operation(s) at block 1605 or 1610 may be performed using the wireless communication management component 620 or 860 described with reference to FIG. 6 or 8, or the RACH management component 645 described with reference to FIG. 6.

Thus, the method 1600 may provide for wireless communication. It should be noted that the method 1600 is just one implementation and that the operations of the method 1600 may be rearranged or otherwise modified such that other implementations are possible.

Figure 17:
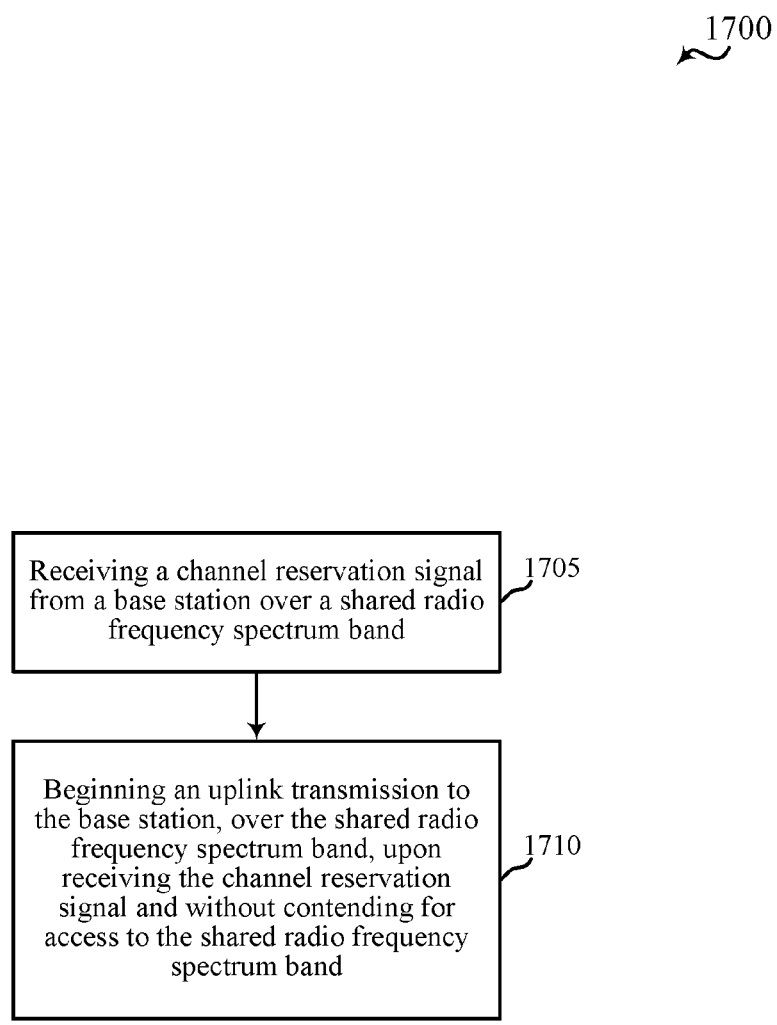
FIG. 17 is a flow chart illustrating an exemplary method for wireless communication, in accordance with various aspects of the present disclosure.

FIG. 17 is a flow chart illustrating an exemplary method 1700 for wireless communication, in accordance with various aspects of the present disclosure. For clarity, the method 1700 is described below with reference to aspects of one or more of the UEs 115, 215, 215-*a*, 215-*b*, 215-*c*, 415, 415-*a*, or 815 described with reference to FIG. 1, 2, 4A, 4B, or 8, or aspects of the apparatus 615 described with reference to FIG. 6. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 1705, the method 1700 may include receiving a channel reservation signal from a base station over a shared radio frequency spectrum band. The shared radio frequency spectrum band may include a radio frequency spectrum band for which transmitting apparatuses may contend for access (e.g., a radio frequency spectrum band that is available for unlicensed use, such as Wi-Fi use, or a radio frequency spectrum band that is available for use by multiple operators in an equally shared or prioritized manner). In some examples, the channel reservation signal may include a D-CUBS. In some examples, the channel reservation signal may include a PFFICH indicating an uplink only mode.

In some examples, the channel reservation signal may be transmitted by a base station that accesses the shared radio frequency spectrum band, performs a CCA procedure, and determines the shared radio frequency spectrum band is available just before an uplink transmission is to be made by a UE or apparatus performing the method 1700. In some examples, the base station may transmit the channel reservation signal without any downlink data or other reference signal, and when feasible enter a sleep state. In other examples, the channel reservation signal may include a PFFICH identifying a beginning of an uplink only mode.

At block 1710, the method 1700 may include beginning an uplink transmission to the base station, over the shared radio frequency spectrum band, upon receiving the channel reservation signal and without contending for access to the shared radio frequency spectrum band. In some examples, the uplink transmission may be preceded by another uplink transmission.

The operation(s) at block 1705 or 1710 may be performed using the wireless communication management component 620 or 860 described with reference to FIG. 6 or 8, or the base station-triggered uplink management component 650 described with reference to FIG. 6.

Thus, the method 1700 may provide for wireless communication. It should be noted that the method 1700 is just one implementation and that the operations of the method 1700 may be rearranged or otherwise modified such that other implementations are possible.

Figure 18:
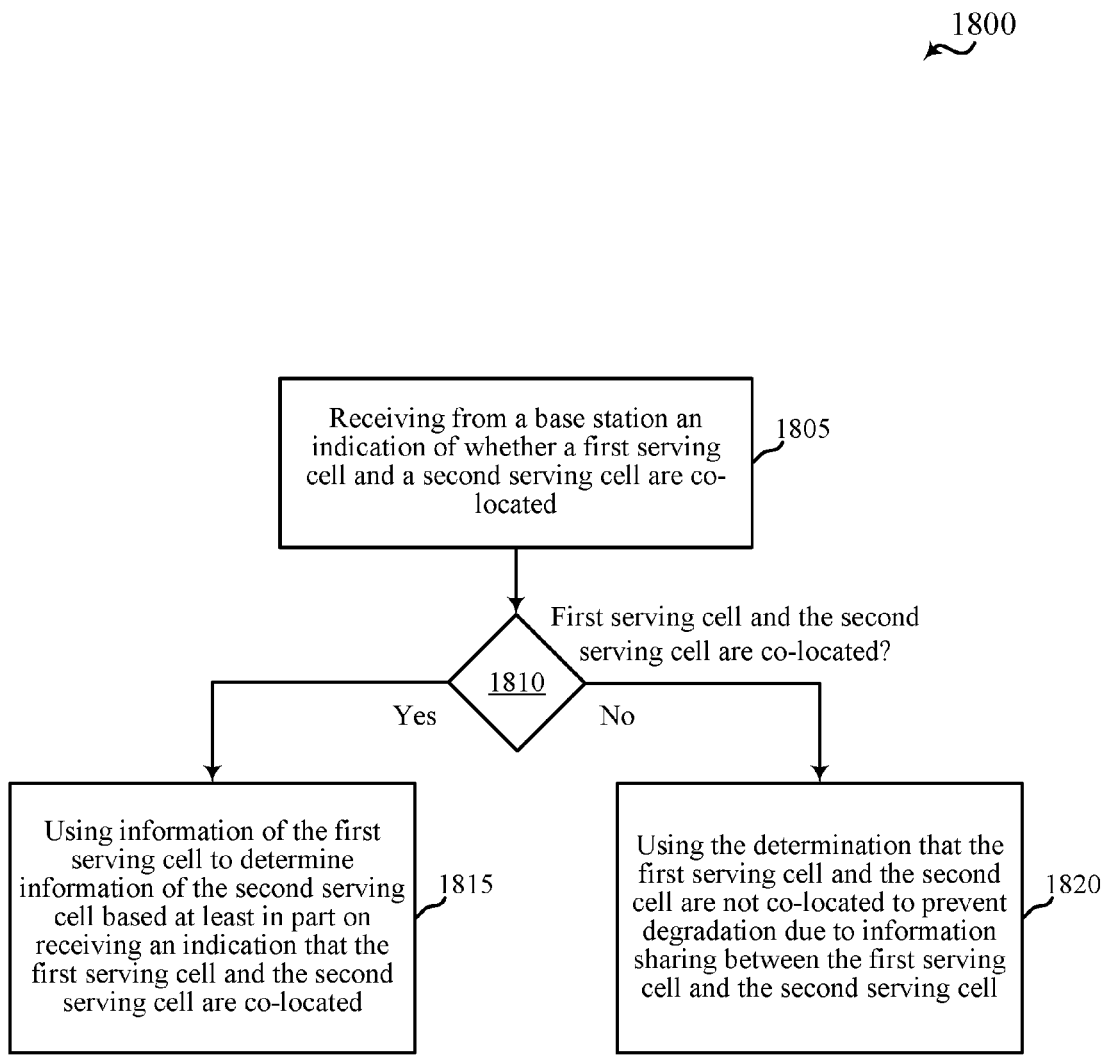
FIG. 18 is a flow chart illustrating an exemplary method for wireless communication, in accordance with various aspects of the present disclosure.

FIG. 18 is a flow chart illustrating an exemplary method 1800 for wireless communication, in accordance with various aspects of the present disclosure. For clarity, the method 1800 is described below with reference to aspects of one or more of the UEs 115, 215, 215-*a*, 215-*b*, 215-*c*, 415, 415-*a*, or 815 described with reference to FIG. 1, 2, 4A, 4B, or 8, or aspects of the apparatus 615 described with reference to FIG. 6. In some examples, a UE or apparatus may execute one or more sets of codes to control the functional elements of the UE or apparatus to perform the functions described below. Additionally or alternatively, the UE or apparatus may perform one or more of the functions described below using special-purpose hardware.

At block 1805, the method 1800 may include receiving from a base station an indication of whether a first serving cell and a second serving cell are co-located. In some examples, the base station may obtain and transmit the indication when the first serving cell and the second serving cell are co-located, or when the first serving cell and the second serving cell are connected by an ideal (e.g., low latency) backhaul.

At block 1810, the method 1800 may include determining whether the first serving cell and the second serving cell are co-located. When it is determined that the first serving cell and the second serving cell are co-located, the method 1800 may continue at block 1815. When it is determined that the first serving cell and the second serving cell are not co-located, the method 1800 may continue at block 1820. In some examples, the first serving cell and the second serving cell may belong to the same TAG but may not be co-located.

At block 1815, the method 1800 may include using information of the first serving cell to determine information of the second serving cell, based at least in part on receiving an indication that the first serving cell and the second serving cell are co-located. In some examples, the information of the first serving cell may include at least one of a first time tracking, a first frequency tracking, a first Doppler tracking, or a first path loss measurement, and the information of the second serving cell may include at least one of a second time tracking, a second frequency tracking, a second Doppler tracking, or a second path loss measurement.

At block 1820, the method 1800 may include using the determination that the first serving cell and the second serving cell are not co-located to prevent degradation due to information sharing between the first serving cell and the second serving cell.

In some examples of the method 1800, one or both of the first serving cell and the second serving cell may communicate with a UE or apparatus performing the method 1800 over a dedicated radio frequency spectrum band, or one or both of the first serving cell and the second serving cell may communicate with the UE or apparatus over a shared radio frequency spectrum band. In some examples, one of the first serving cell and the second serving cell may be a PCell for the UE or apparatus, and the other of the first serving cell and the second serving cell may be a SCell for the UE or apparatus. In other examples, at least one of the first serving cell and the second serving cell may be an SCell for the UE or apparatus. The dedicated radio frequency spectrum band may include a radio frequency spectrum band for which transmitting apparatuses may not contend for access because the radio frequency spectrum band is licensed to some users for some uses (e.g., a licensed radio frequency spectrum band usable for LTE/LTE-A communications). The shared radio frequency spectrum band may include a radio frequency spectrum band for which transmitting apparatuses may contend for access (e.g., a radio frequency spectrum band that is available for unlicensed use, such as Wi-Fi use, or a radio frequency spectrum band that is available for use by multiple operators in an equally shared or prioritized manner).

In some examples of the method 1800, an indication of whether serving cells are co-located may be received for each pair of serving cells, or a list (or lists) of co-located serving cells may be received.

The operation(s) at block 1805, 1810, 1815, or 1820 may be performed using the wireless communication management component 620 or 860 described with reference to FIG. 6 or 8, or the serving cell information management component 655 described with reference to FIG. 6.

Thus, the method 1800 may provide for wireless communication. It should be noted that the method 1800 is just one implementation and that the operations of the method 1800 may be rearranged or otherwise modified such that other implementations are possible.

In some examples, operation(s) of the methods 1000, 1100, 1200, 1300, 1400, 1500, 1600, 1700, or 1800 described with reference to FIG. 10, 11, 12, 13, 14, 15, 16, 17, or 18 may be combined.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media may include RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication at a user equipment (UE), comprising:
   receiving a semi-static partial subframe configuration and a corresponding partial subframe identifier, wherein the semi-static partial subframe configuration is associated with a partial subframe duration having a control portion and a data portion;
   receiving a grant for a partial subframe, the grant identifying the partial subframe identifier; and
   receiving data scheduled for the partial subframe over a shared radio frequency spectrum band based at least in part on the semi-static partial subframe configuration.

2. The method of claim 1, further comprising:
   receiving the semi-static partial subframe configuration in a radio resource control (RRC) message.

3. The method of claim 1, wherein the semi-static partial subframe configuration comprises a resource block (RB) allocation type, or a RB allocation, or a transmission rank, or a modulation and coding scheme (MCS), or a transport block size (TBS) table, or a combination thereof.

4. The method of claim 1, further comprising:
   receiving a dynamic partial subframe configuration; and
   receiving the data scheduled for the partial subframe based at least in part on the dynamic partial subframe configuration.

5. The method of claim 1, wherein the semi-static partial subframe configuration comprises at least one of a time domain multiplexed (TDM) configuration or a frequency domain multiplexed (FDM) configuration.

6. The method of claim 1, wherein the grant for the partial subframe comprises a hybrid automatic repeat request (HARQ) identifier (ID), or a retransmission index, or a new data indicator (NDI), or a combination thereof.

7. The method of claim 1, wherein the grant is received over a dedicated radio frequency spectrum band.

8. The method of claim 1, further comprising:
   receiving data scheduled for a plurality of partial subframes over the shared radio frequency spectrum band based at least in part on the semi-static partial subframe configuration.

9. The method of claim 1, further comprising:
   receiving a retransmission of data initially transmitted in the partial subframe in at least one full subframe.

10. The method of claim 1, wherein the semi-static partial subframe configuration is for a partial subframe occurring at a beginning of a subframe or at an end of a subframe.

11. The method of claim 1, wherein the semi-static partial subframe configuration indicates a type of partial subframe to which the semi-static partial subframe configuration applies.

12. The method of claim 11, wherein the partial subframe type is based at least in part on a length of partial subframe.

13. The method of claim 12, further comprising:
   determining whether the partial subframe is an uplink partial subframe or a downlink partial subframe based at least in part on the length of the partial subframe.

14. The method of claim 13, further comprising, after determining whether the partial subframe is an uplink partial subframe or a downlink partial subframe:
   adjusting at least one parameter of an initial or end partial subframe.

15. The method of claim 14, wherein adjusting the at least one parameter comprises:
   selecting from a list of predetermined configurations.

16. The method of claim 1, further comprising:
   receiving an indication of at least one of:
   a number of partial subframes to which the semi-static partial subframe configuration applies;
   a number of downlink bursts to which the semi-static partial subframe configuration applies;
   a time duration to which the semi-static partial subframe configuration applies; or
   an indication that the semi-static partial subframe configuration applies until an alternative indication is received.

17. An apparatus for wireless communication at a user equipment (UE), comprising:
   a processor;
   memory in electronic communication with the processor; and
   the processor and memory configured to:
   receive a semi-static partial subframe configuration and a corresponding partial subframe identifier, wherein the semi-static partial subframe configuration is associated with a partial subframe duration having a control portion and a data portion;
   receive a grant for a partial subframe, the grant identifying the partial subframe identifier; and
   receive data scheduled for the partial subframe over a shared radio frequency spectrum band based at least in part on the semi-static partial subframe configuration.

18. The apparatus of claim 17, wherein the processor and memory are further configured to:
   receive the semi-static partial subframe configuration in a radio resource control (RRC) message.

19. The apparatus of claim 17, wherein the semi-static partial subframe configuration comprises a resource block (RB) allocation type, or a RB allocation, or a transmission rank, or a modulation and coding scheme (MCS), or a transport block size (TBS) table, or a combination thereof.

20. The apparatus of claim 17, wherein the processor and memory are further configured to:
   receive a dynamic configuration for communications according to partial subframes; and
   receive the data scheduled for the partial subframe based at least in part on the dynamic partial subframe configuration.

21. The apparatus of claim 17, wherein the semi-static partial subframe configuration comprises at least one of a time domain multiplexed (TDM) configuration or a frequency domain multiplexed (FDM) configuration.

22. The apparatus of claim 17, wherein the grant for the partial subframe comprises a hybrid automatic repeat request (HARM) identifier (ID), or a retransmission index, or a new data indicator (NDI), or a combination thereof.

23. The apparatus of claim 17, wherein the grant is received over a dedicated radio frequency spectrum band.

24. The apparatus of claim 17, wherein the processor and memory are further configured to:
   receive data scheduled for a plurality of partial subframes over the shared radio frequency spectrum band based at least in part on the semi-static partial subframe configuration.

25. The apparatus of claim 17, wherein the processor and memory are further configured to:
   receive a retransmission of data initially transmitted in the partial subframe in at least one full subframe.

26. The apparatus of claim 17, wherein the semi-static partial subframe configuration is for a partial subframe occurring at a beginning of a subframe or at an end of a subframe.

27. The apparatus of claim 17, wherein the semi-static partial subframe configuration indicates a type of partial subframe to which the semi-static partial subframe configuration applies.

28. The apparatus of claim 27, wherein the type of partial subframe is based at least in part on a length of partial subframe.

29. An apparatus for wireless communication at a user equipment (UE), comprising:
- means for receiving a semi-static partial subframe configuration and a corresponding partial subframe identifier, wherein the semi-static partial subframe configuration is associated with a partial subframe duration having a control portion and a data portion;
- means for receiving a grant for a partial subframe, the grant identifying the partial subframe identifier; and
- means for receiving data scheduled for the partial subframe over a shared radio frequency spectrum band based at least in part on the semi-static partial subframe configuration.

30. A non-transitory computer readable medium storing computer-executable code for wireless communication, the code comprising instructions executable by a processor to:
- receive a semi-static partial subframe configuration and a corresponding partial subframe identifier, wherein the semi-static partial subframe configuration is associated with a partial subframe duration having a control portion and a data portion;
- receive a grant for a partial subframe, the grant identifying the partial subframe identifier; and
- receive data scheduled for the partial subframe over a shared radio frequency spectrum band based at least in part on the semi-static partial subframe configuration.

* * * * *